(12) United States Patent
Pathak et al.

(10) Patent No.: US 12,541,731 B1
(45) Date of Patent: Feb. 3, 2026

(54) METHOD AND SYSTEM FOR RESTRUCTURING AN ORGANIZATION TO SATISFY THE ORGANIZATION'S GOALS

(71) Applicant: Dell Products L.P., Round Rock, TX (US)

(72) Inventors: Priyanka Pathak, Bangalore (IN); Adya Jha, Noida (IN); Saurabh Jha, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/890,992

(22) Filed: Sep. 20, 2024

(51) Int. Cl.
*G06Q 10/06* (2023.01)
*G06Q 10/0637* (2023.01)

(52) U.S. Cl.
CPC ................. *G06Q 10/0637* (2013.01)

(58) Field of Classification Search
None
See application file for complete search history.

(56) References Cited

U.S. PATENT DOCUMENTS

2009/0138307 A1* 5/2009 Belcsak ............... G06Q 40/06 715/708
2022/0366494 A1* 11/2022 Cella .................... H04L 9/3231

\* cited by examiner

*Primary Examiner* — Alan Torrico-Lopez
(74) *Attorney, Agent, or Firm* — Chamberlain, Hrdlicka, White, Williams & Aughtry; Aly Z. Dossa

(57) ABSTRACT

A method for managing resources of an organization includes: receiving, by a reinforcement learning module (RLM), a restructuring request from a user via a graphical user interface (GUI); obtaining, by the RLM and upon receiving the request, current groups of collectors; analyzing, by the RLM and using a trained model, details associated with the current groups of collectors; making, by the RLM and based on the details, a determination that a first restructuring action needs to be applied; and initiating, by the RLM, applying the first restructuring action to continue satisfying the organization's goals.

20 Claims, 8 Drawing Sheets

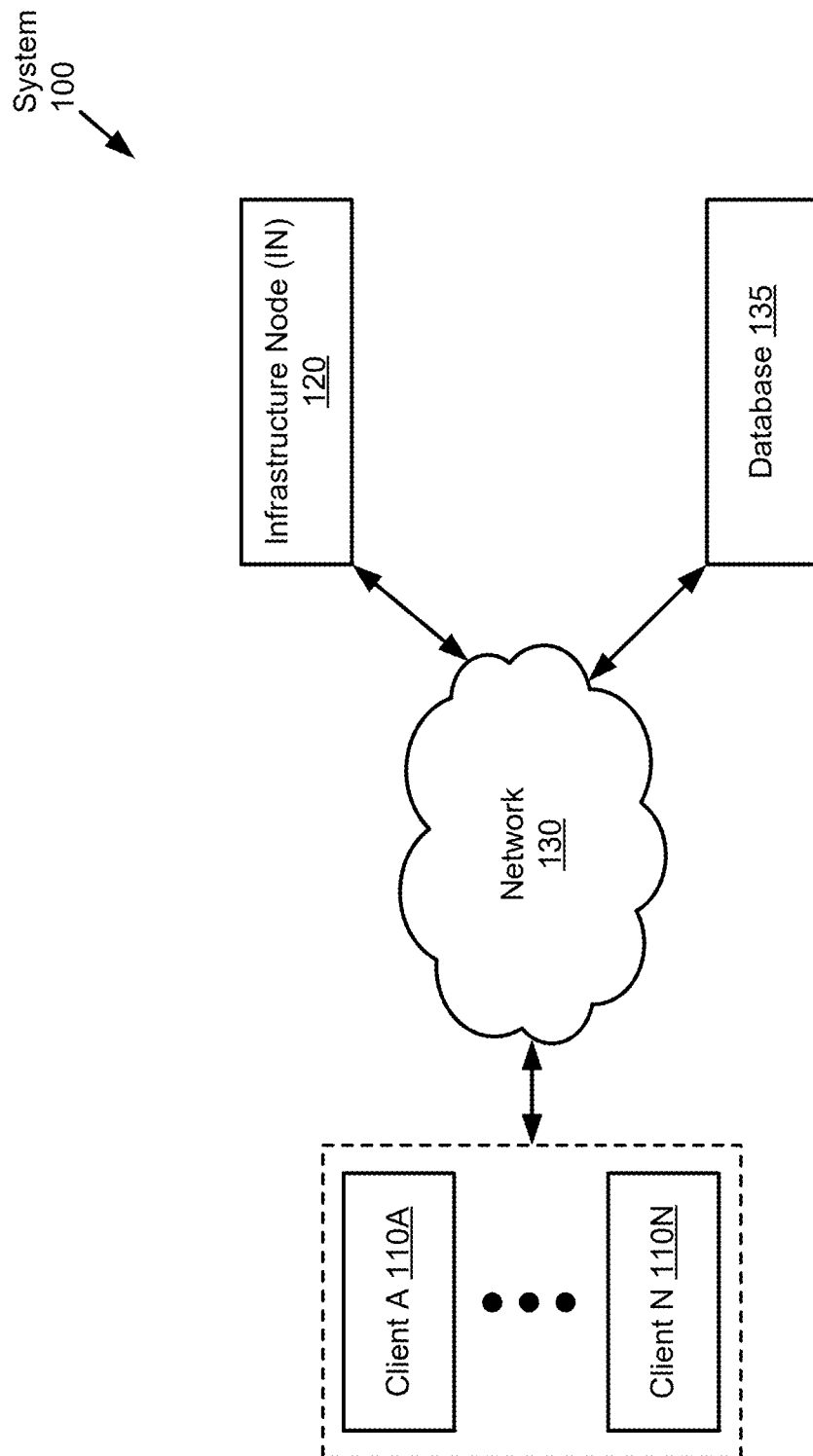

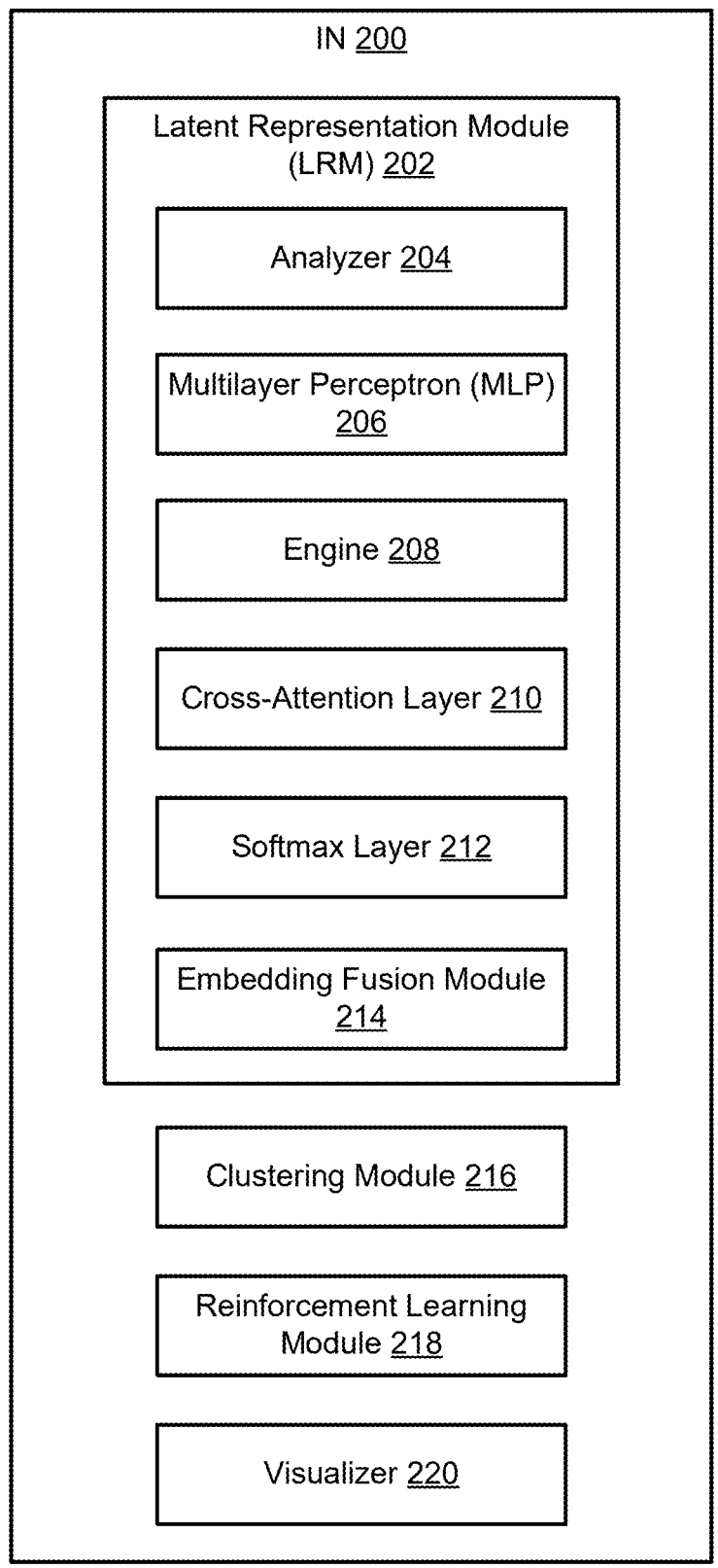
FIG. 2.1

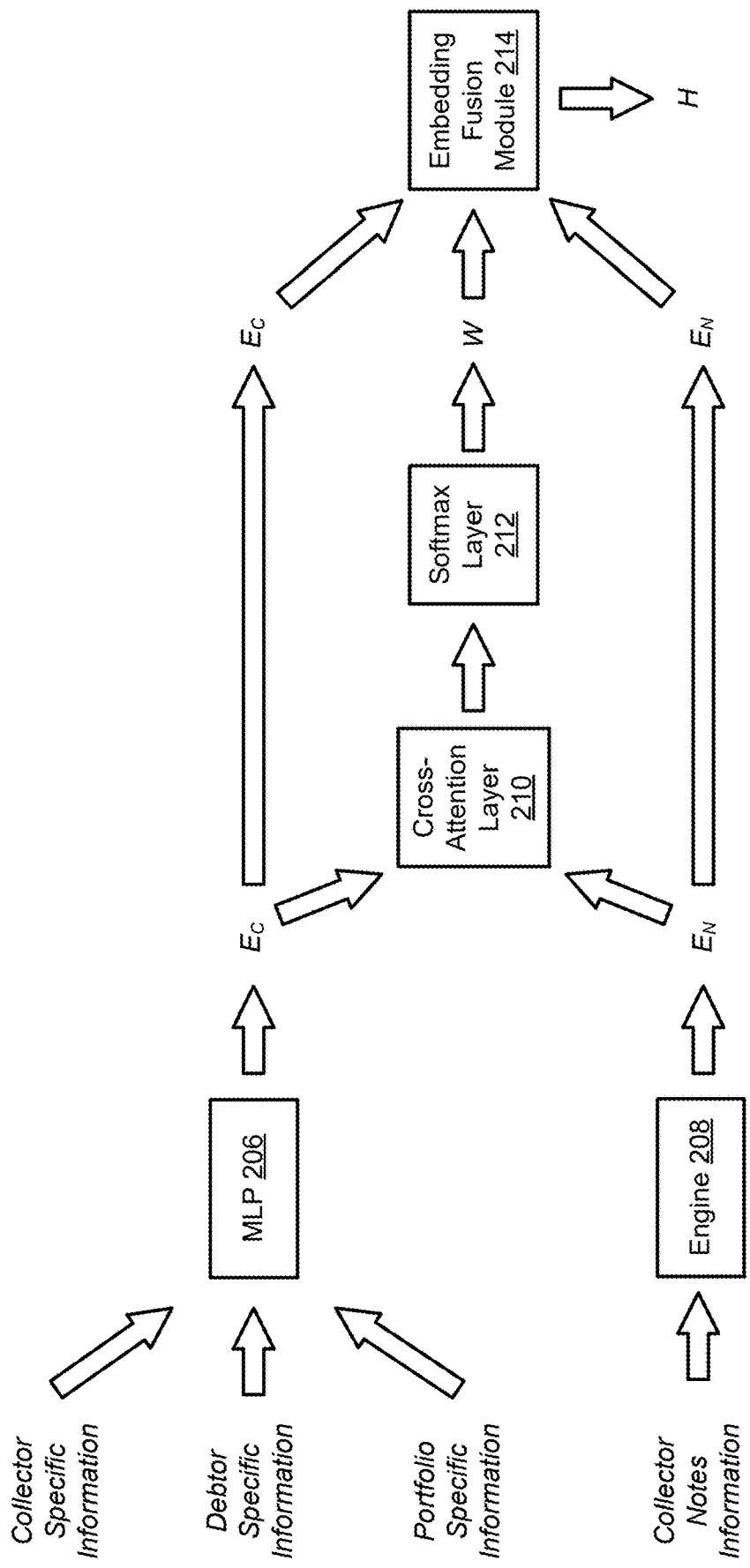
FIG. 2.2

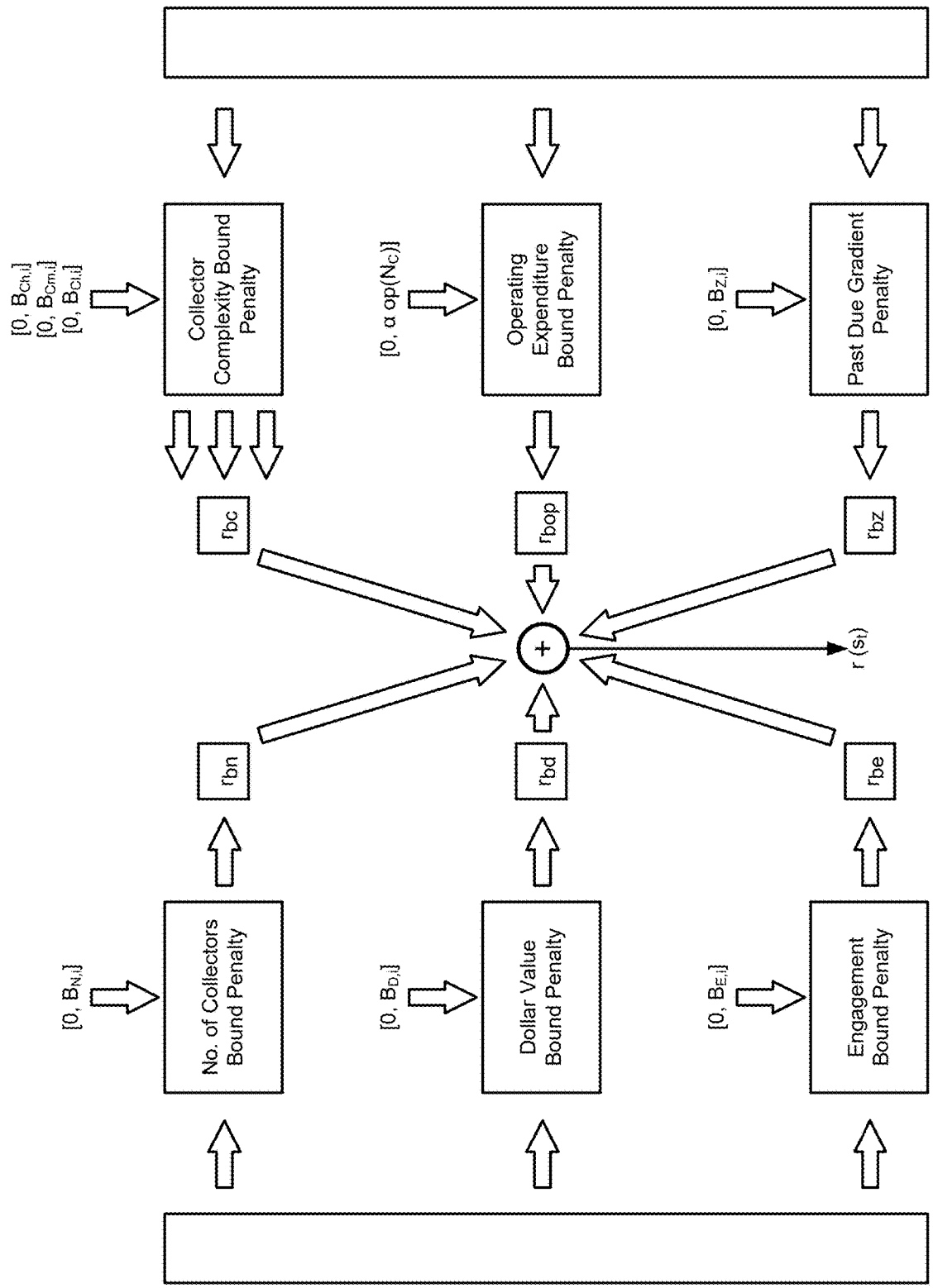
FIG. 2.3

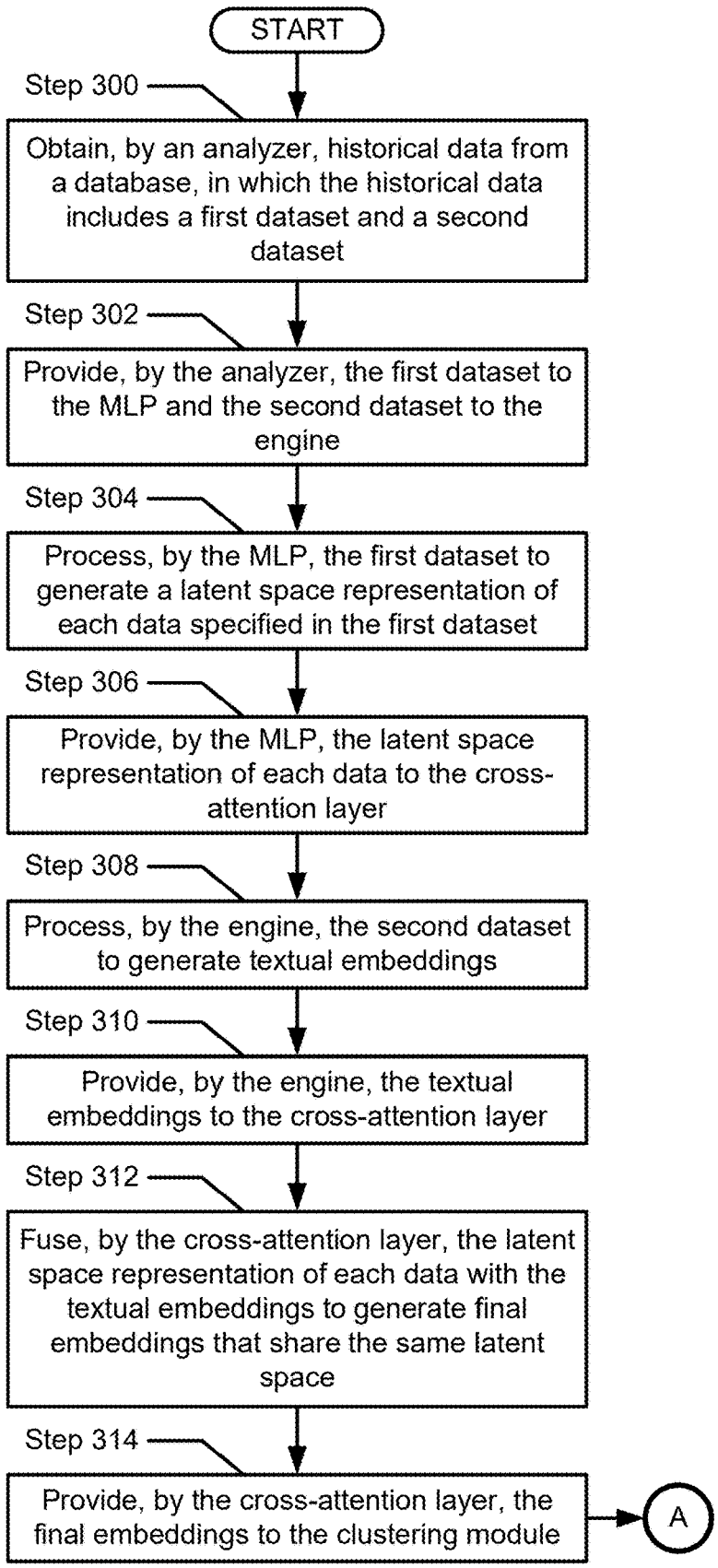
FIG. 3.1

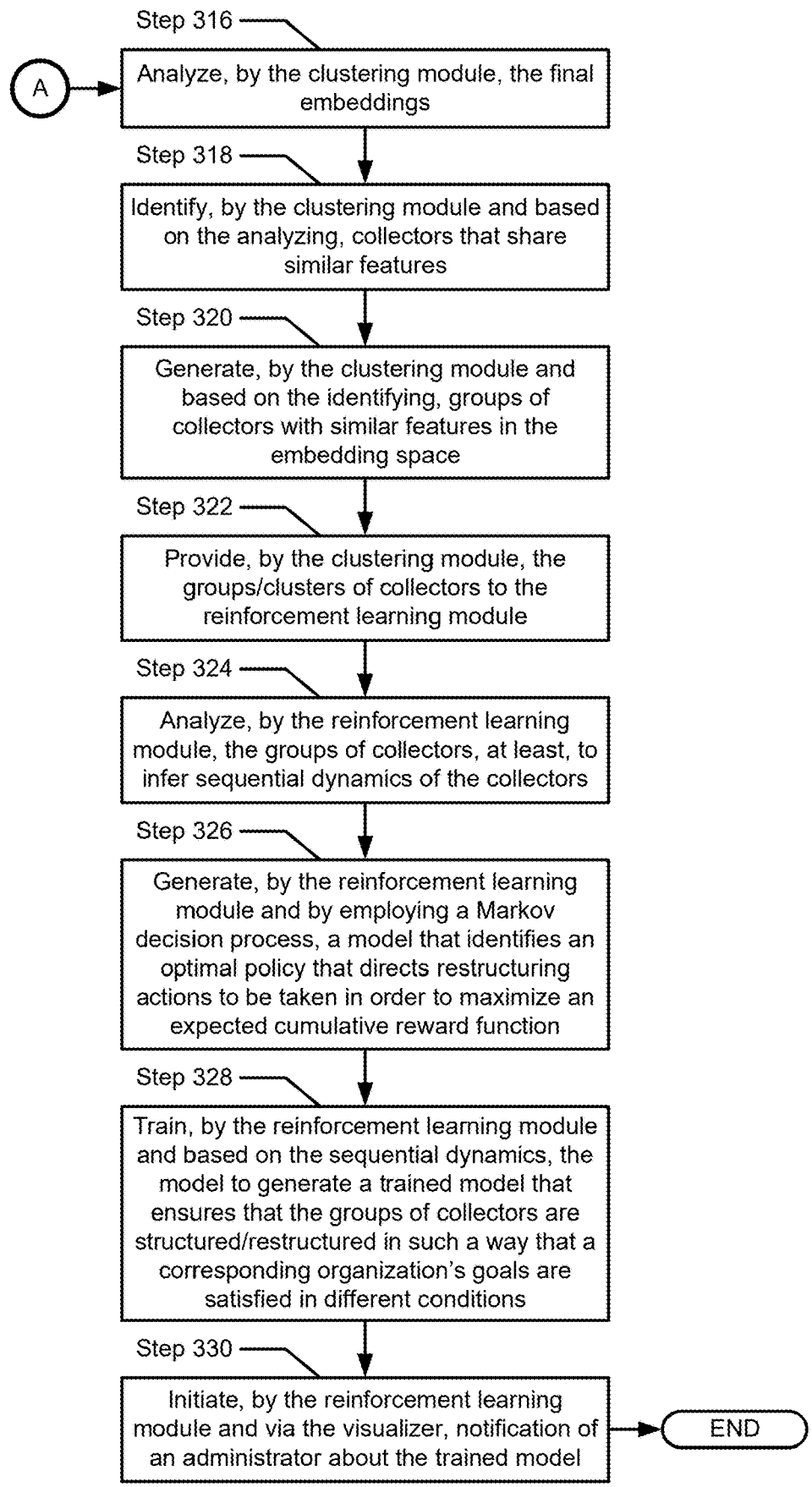
FIG. 3.2

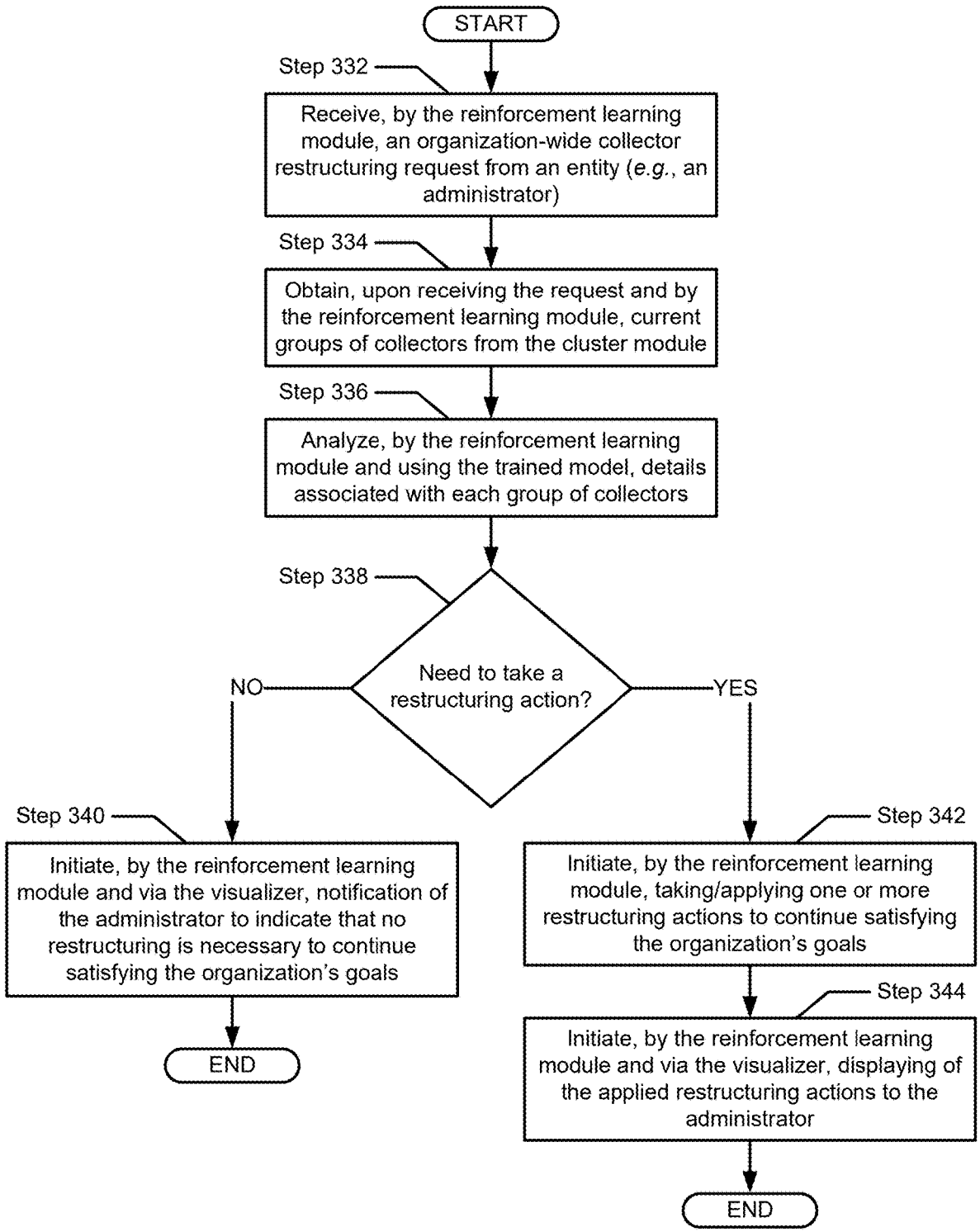
FIG. 3.3

METHOD AND SYSTEM FOR RESTRUCTURING AN ORGANIZATION TO SATISFY THE ORGANIZATION'S GOALS

BACKGROUND

Devices are often capable of performing certain functionalities that other devices are not configured to perform, or are not capable of performing. In such scenarios, it may be desirable to adapt one or more systems to enhance the functionalities of devices that cannot perform those functionalities.

BRIEF DESCRIPTION OF DRAWINGS

Certain embodiments disclosed herein will be described with reference to the accompanying drawings. However, the accompanying drawings illustrate only certain aspects or implementations of one or more embodiments disclosed herein by way of example, and are not meant to limit the scope of the claims.

FIG. 1 shows a diagram of a system in accordance with one or more embodiments disclosed herein.

FIG. 2.1 shows a diagram of an infrastructure node in accordance with one or more embodiments disclosed herein.

FIG. 2.2 shows an example latent representation flow in accordance with one or more embodiments disclosed herein.

FIG. 2.3 shows an example reward formulation in accordance with one or more embodiments disclosed herein.

FIGS. 3.1-3.3 show a method for managing restructuring of an organization in accordance with one or more embodiments disclosed herein.

DETAILED DESCRIPTION

Figure 4:
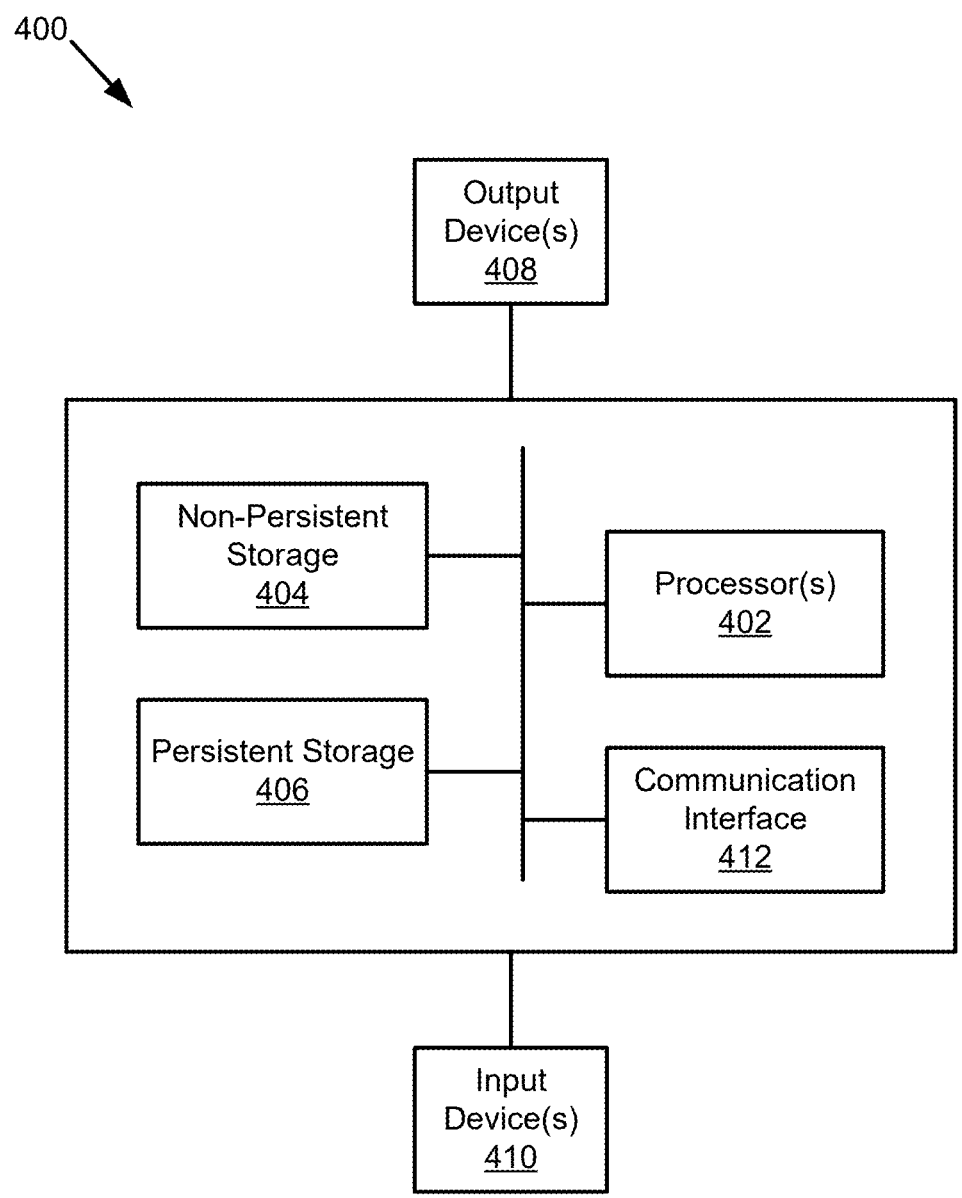
FIG. 4 shows a diagram of a computing device in accordance with one or more embodiments disclosed herein.

Specific embodiments disclosed herein will now be described in detail with reference to the accompanying figures. In the following detailed description of the embodiments disclosed herein, numerous specific details are set forth in order to provide a more thorough understanding of one or more embodiments disclosed herein. However, it will be apparent to one of ordinary skill in the art that the one or more embodiments disclosed herein may be practiced without these specific details. In other instances, well-known features have not been described in detail to avoid unnecessarily complicating the description.

In the following description of the figures, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase "operatively connected" may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, organizations deal with huge amount of debt at any point and collectors (or debt collector people) need to handle one or more debtors each quarter. Each of the collectors has a portfolio that represents a set of debtors on which a related collector will perform one or more debt recovery actions (e.g., reminding an upcoming due payment to a debtor, sending a notification to a debtor regarding a payment error detected in an invoice, etc.). Usually, each organization employs different types of collectors who vary based on their levels of productivity, years of experience, area of expertise, and managerial hierarchy at the organization.

A debt collection process involves collectors performing debt recovery actions that are taken at different points-in-time by contacting debtors to discuss repayment plans, reminding them about agreed repayment conditions, and/or when the repayment is due or past due. As indicated, collectors play a crucial role in getting debtors to repay their debt as the collectors form a connecting link between a related organization and the debtors. The key responsibility for collectors is to contact the debtors in their portfolio daily via, for example, phone calls and/or electronic mails. A collector may nudge a particular debtor to repay his/her debt as soon as possible if the debtor has passed his/her due date and may remind the debtor about an upcoming due date if his/her due date has not passed yet. Further, collectors may also raise tickets for any concerns or disputes that they have faced in related invoices or for the debt repayment arrangements with one or more debtors.

As indicated, collectors are critical resources for each organization as collectors perform key debt repayment actions in a given debt to cash cycle, while ensuring prompt debt recovery and enhanced cash flow. Thus, it is critical to perform operating expenditure (OpEx) reduction and organizational reconstruction exercises (e.g., redistributing debtor related workloads among remaining collectors when one of the collectors left the organization) with high caution and intelligence with this workforce (i.e., collectors or collector workforce). While each organization would want to retain its top collectors, an organization should also maintain healthy levels of staffing (in terms of, at least, collectors) so that the organization have enough workforce to handle similar trends of incoming debtor workloads (e.g., files, folders, etc.) even after restructuring exercises.

In most cases, performing a restructuring strategy is not a straightforward process as a corresponding organization needs to account for (i) parameters related to collectors, (ii) parameters related to debtors, and (iii) parameters describing a relationship between a debtor and a collector. A collector may need to handle multiple debtor cases simultaneously, with different levels of complexity and different amounts of money owed, through various ways of contacting each debtor. Not all debtors may show similar repayment behaviors: some debtors may be willful defaulters, while some debtors may repay their debt amount well in advance of the due date, and some debtors may repay upfront when the debt amount is small but tend to take longer for higher debt amounts. Further, a repayment behavior of a debtor may be influenced by various parameters/features such as (i) the debtor's relationship with a related organization, (ii) the debtor's relationship with one or more collectors (employed by the organization), and (iii) the debtor's previous collection experience (with the organization) apart from other unaccountable conditions.

Existing solutions/approaches do not model the evolution of the workforce with time within a related organization, where the evolution is either modeled at an individual collector level or at an overall collector level. While modeling at an individual collector level may become computationally intractable as the number of collectors increases, modeling at an overall collector level may not be granular enough to model one or more differences among different collectors. Moreover, (i) some of the existing approaches (e.g., optimization-based solutions) model restructuring strategies (e.g., of collector workforce) as optimization problems with optimization objectives and constraints (where these solutions may not provide highly accurate restructuring strategies as organizational and strategic goals may not be accurately formulated as objective functions) and (ii) some of the existing approaches model restructuring strategies (e.g., of collector workforce) based on a combination of features such as human resources knowledge, workforce productivity, and managerial span of control (without considering sequential dynamics of the workforce quarter over quarter).

Further, traditional solutions (i) lack feedback systems and are not efficient in handling heterogeneous workforce with uncertainty, (ii) requires deep understanding of organizational goals and constraints paired with mathematical knowledge to generate a restructuring strategy; (iii) model the generation of a restructuring strategy problem based on a simple setting, with assumptions that do not closely model real-world dynamics as otherwise performing an optimization becomes intractable; (iv) only use quantitative data to consider the efficiency and importance of a collector to a related organization; and/or (v) either consider the problem at an overall level where all collectors are assumed to be same, or at an individual level where each collector is different from another.

For at least the reasons discussed above and without requiring resource-intensive efforts (e.g., time, engineering, etc.), a fundamentally different approach/framework is needed (e.g., a framework that provides smart and automated restructuring strategies that are capable of accounting for different parameters when generating restructuring strategies (or reorganization plans) so that organizations will be able to achieve their strategic and operational goals, while the framework ensures that organizations are adequately staffed with the correct collector workforce to take on incoming debtor cases).

Embodiments disclosed herein relate to methods and systems for managing restructuring of an organization. As a result of the processes discussed below, one or more embodiments disclosed herein advantageously ensure that: (i) the framework that enables smart and automated restructuring strategies that are capable of accounting for different parameters when generating the restructuring strategies is provided so that organizations will be able to achieve their strategic and operational goals; (ii) the framework enables that organizations are adequately staffed with the correct collector workforce to take on incoming debtor cases; (iii) the framework generates a collector workforce restructuring strategy by leveraging a deep reinforcement learning approach (that models the evolution of the workforce in an organization as a sequential problem); (iv) the framework enables an organization to meet its strategic goals while maintaining a continuous flow of operations and organizational mandates resulting in enhanced decision-making, prompt debt recovery, and cash flow; (v) the framework performs OpEx reduction and organizational reconstruction exercises with high caution and intelligence with the collector workforce; (vi) the framework overcomes at least the aforementioned challenges by modelling sequential dynamics of the collector workforce (or any other workforce) as a Markov chain and generates restructuring strategies by employing reinforcement learning models; (vii) the framework employs reinforcement learning models (e.g., a conservative Q learning model) based on historical workforce dynamics data to learn/infer a state action value function; (viii) while generating a restructuring strategy, the framework uses (a) representations (e.g., latent space representations) from different inputs, (b) a concatenation of one or more latent variables obtained from graph embeddings of a heterogeneous collector-debtor graph structure, and (c) textual sentiment embeddings of comments (made by one or more collectors) after an interaction with a debtor; (ix) the framework employs deep clustering on latent space representations to group similar collectors with each other based on (a) each collector's individual features and (b) each collector's relationship features with one or more debtors; (x) the framework generates restructuring strategies/actions for one or more collectors in each "collector" cluster and aims to optimize a long-term reward function (which represents a related organization's strategic goals and organizational mandates); (xi) the framework does not only perform organizational restructuring actions, but also prescribes optimal redistribution of debtor related workloads (after restructuring) to ensure continued high-productivity and smooth flow of operations across a related organization; (xii) for a better user experience, the framework can also be used in other domains as the framework does not require any prior domain knowledge; (xiii) for a better user experience, an organization restructuring strategy (generated by the framework) is flexible and can be applied to a wide range of problems (as the framework does not depend on problem specifics); (xiv) a feedback system and reward function definitions make the framework robust and flexible for long-term planning with heterogeneous workforce; (xv) the framework is a model-free framework and can learn from data demonstrations and does not require expert domain knowledge as the framework can learn using reinforcement learning through trial-and-error; (xvi) the framework is generic and widely applicable, and since the framework leverages reinforcement learning, framework does not become intractable for non-linear objectives/constraints; (xvii) the framework employs a holistic approach as the framework models various aspects (e.g., textual notes of a collector in the state representation, the capacity of the collector, the complexity handled by the collector, etc.) to assess each collector's value to the organization before performing restructuring actions on the collector; and/or (xviii) the framework learns to trade-off between intractability and personalized restructuring actions by learning to cluster collectors at different levels of granularity and degrees of control.

The following describes various embodiments disclosed herein.

FIG. 1 shows a diagram of a system (100) in accordance with one or more embodiments disclosed herein. The system (100) includes any number of clients (e.g., Client A (110A), Client N (110N), etc.), a network (130), any number of infrastructure nodes (IN) (e.g., 120), and a database (135). The system (100) may include additional, fewer, and/or different components without departing from the scope of the embodiments disclosed herein. Each component may be operably/operatively connected to any of the other components via any combination of wired and/or wireless connections. Each component illustrated in FIG. 1 is discussed below.

In one or more embodiments, the clients (e.g., 110A, 110N, etc.), the IN (120), the network (130), and the database (135) may be (or may include) physical hardware or logical devices, as discussed below. While FIG. 1 shows a specific configuration of the system (100), other configurations may be used without departing from the scope of the embodiments disclosed herein. For example, although the clients (e.g., 110A, 110N, etc.) and the IN (120) are shown to be operatively connected through a communication network (e.g., 130), the clients (e.g., 110A, 110N, etc.) and the IN (120) may be directly connected (e.g., without an intervening communication network).

Further, the functioning of the clients (e.g., 110A, 110N, etc.) and the IN (120) is not dependent upon the functioning and/or existence of the other components (e.g., devices) in the system (100). Rather, the clients and the IN may function independently and perform operations locally that do not require communication with other components. Accordingly, embodiments disclosed herein should not be limited to the configuration of components shown in FIG. 1.

As used herein, "communication" may refer to simple data passing, or may refer to two or more components coordinating a job. As used herein, the term "data" is intended to be broad in scope. In this manner, that term embraces, for example (but not limited to): a data stream (or stream data), data chunks, data blocks, atomic data, emails, objects of any type, files of any type (e.g., media files, spreadsheet files, database files, etc.), contacts, directories, sub-directories, volumes, etc.

In one or more embodiments, although terms such as "document", "file", "segment", "block", or "object" may be used by way of example, the principles of the present disclosure are not limited to any particular form of representing and storing data or other information. Rather, such principles are equally applicable to any object capable of representing information.

In one or more embodiments, the system (100) may be a distributed system (e.g., a data processing environment) and may deliver at least computing power (e.g., real-time (on the order of milliseconds (ms) or less) network monitoring, server virtualization, etc.), storage capacity (e.g., data backup), and data protection (e.g., software-defined data protection, disaster recovery, etc.) as a service to users of clients (e.g., 110A, 110N, etc.). For example, the system may be configured to organize unbounded, continuously generated data into a data stream. The system (100) may also represent a comprehensive middleware layer executing on computing devices (e.g., 400, FIG. 4) that supports application and storage environments.

In one or more embodiments, the system (100) may support one or more virtual machine (VM) environments, and may map capacity requirements (e.g., computational load, storage access, etc.) of VMs and supported applications to available resources (e.g., processing resources, storage resources, etc.) managed by the environments. Further, the system (100) may be configured for workload placement collaboration and computing resource (e.g., processing, storage/memory, virtualization, networking, etc.) exchange.

To provide computer-implemented services to the users, the system (100) may perform some computations (e.g., data collection, distributed processing of collected data, etc.) locally (e.g., at the users' site using the clients (e.g., 110A, 110N, etc.)) and other computations remotely (e.g., away from the users' site using the IN (120)) from the users. By doing so, the users may utilize different computing devices (e.g., 400, FIG. 4) that have different quantities of computing resources (e.g., processing cycles, memory, storage, etc.) while still being afforded a consistent user experience. For example, by performing some computations remotely, the system (100) (i) may maintain the consistent user experience provided by different computing devices even when the different computing devices possess different quantities of computing resources, and (ii) may process data more efficiently in a distributed manner by avoiding the overhead associated with data distribution and/or command and control via separate connections.

As used herein, "computing" refers to any operations that may be performed by a computer, including (but not limited to): computation, data storage, data retrieval, communications, etc. Further, as used herein, a "computing device" refers to any device in which a computing operation may be carried out. A computing device may be, for example (but not limited to): a compute component, a storage component, a network device, a telecommunications component, etc.

As used herein, a "resource" refers to any program, application, document, file, asset, executable program file, desktop environment, computing environment, or other resource made available to, for example, a user/customer of a client (described below). The resource may be delivered to the client via, for example (but not limited to): conventional installation, a method for streaming, a VM executing on a remote computing device, execution from a removable storage device connected to the client (such as universal serial bus (USB) device), etc.

In one or more embodiments, a client (e.g., 110A, 110N, etc.) may include functionality to, e.g.: (i) capture sensory input (e.g., sensor data) in the form of text, audio, video, touch or motion, (ii) collect massive amounts of data at the edge of an Internet of Things (IoT) network (where, the collected data may be grouped as: (a) data that needs no further action and does not need to be stored, (b) data that should be retained for later analysis and/or record keeping, and (c) data that requires an immediate action/response), (iii) provide to other entities (e.g., the IN (120)), store, or otherwise utilize captured sensor data (and/or any other type and/or quantity of data), and (iv) provide surveillance services (e.g., determining object-level information, performing face recognition, etc.) for scenes (e.g., a physical region of space). One of ordinary skill will appreciate that the client may perform other functionalities without departing from the scope of the embodiments disclosed herein.

In one or more embodiments, the clients (e.g., 110A, 110N, etc.) may be geographically distributed devices (e.g., user devices, front-end devices, etc.) and may have relatively restricted hardware and/or software resources when compared to the IN (120). As being, for example, a sensing device, each of the clients may be adapted to provide monitoring services. For example, a client may monitor the state of a scene (e.g., objects disposed in a scene). The monitoring may be performed by obtaining sensor data from sensors that are adapted to obtain information regarding the scene, in which a client may include and/or be operatively coupled to one or more sensors (e.g., a physical device adapted to obtain information regarding one or more scenes).

In one or more embodiments, the sensor data may be any quantity and types of measurements (e.g., of a scene's properties, of an environment's properties, etc.) over any period(s) of time and/or at any points-in-time (e.g., any type of information obtained from one or more sensors, in which different portions of the sensor data may be associated with different periods of time (when the corresponding portions of sensor data were obtained)). The sensor data may be obtained using one or more sensors. The sensor may be, for example (but not limited to): a visual sensor (e.g., a camera adapted to obtain optical information (e.g., a pattern of light scattered off of the scene) regarding a scene/environment), an audio sensor (e.g., a microphone adapted to obtain auditory information (e.g., a pattern of sound from the scene) regarding a scene), an electromagnetic radiation sensor (e.g., an infrared sensor), a chemical detection sensor, a temperature sensor, a humidity sensor, a count sensor, a distance sensor, a global positioning system sensor, a biological sensor, a differential pressure sensor, a corrosion sensor, etc.

In one or more embodiments, the clients (e.g., 110A, 110N, etc.) may be physical or logical computing devices configured for hosting one or more workloads, or for providing a computing environment whereon workloads may be implemented. The clients may provide computing environments that are configured for, at least: (i) workload placement collaboration, (ii) computing resource (e.g., processing, storage/memory, virtualization, networking, etc.) exchange, and (iii) protecting workloads (including their applications and application data) of any size and scale (based on, for example, one or more service level agreements (SLAs) configured by users of the clients). The clients (e.g., 110A, 110N, etc.) may correspond to computing devices that one or more users use to interact with one or more components of the system (100).

In one or more embodiments, a client (e.g., 110A, 110N, etc.) may represent a physical appliance or computing device operated by one or more individuals of (or employed by) an organization. Examples of said individual(s) may include, but not limited to, any organization executive(s) (e.g., chief executive officer (CEO), chief financial officer (CFO), etc.), and any employee(s) in the accounting/finance team of the organization (e.g., a collector person). Further, the organization may refer to any enterprise at least engaged in for-profit commercial, industrial, or professional activities.

In one or more embodiments, a collector person (or a collector) may have a portfolio that represents a set of debtors on which the collector will execute debt recovery actions. A collector may perform a debt recovery action by reaching out to a related debtor via, for example, physical mail, electronic mail, and/or phone call to maximize long-term delinquent debt recovered from the debtor. In one or more embodiments, a collector may act as a connecting link between debtors, in which actions/behaviors of the debtors may be highly influential when it comes to repayment of debt.

In one or more embodiments, a client (e.g., 110A, 110N, etc.) may include any number of applications (and/or content accessible through the applications) that provide computer-implemented services to a user. Applications may be designed and configured to perform one or more functions instantiated by a user of the client. In order to provide application services, each application may host similar or different components. The components may be, for example (but not limited to): instances of databases, instances of email servers, etc. Applications may be executed on one or more clients as instances of the application.

Applications may vary in different embodiments, but in certain embodiments, applications may be custom developed or commercial (e.g., off-the-shelf) applications that a user desires to execute in a client (e.g., 110A, 110N, etc.). In one or more embodiments, applications may be logical entities executed using computing resources of a client. For example, applications may be implemented as computer instructions stored on persistent storage of the client that when executed by the processor(s) of the client, cause the client to provide the functionality of the applications described throughout the application.

In one or more embodiments, while performing, for example, one or more operations requested by a user, applications installed on a client (e.g., 110A, 110N, etc.) may include functionality to request and use physical and logical resources of the client. Applications may also include functionality to use data stored in storage/memory resources of the client. The applications may perform other types of functionalities not listed above without departing from the scope of the embodiments disclosed herein. While providing application services to a user, applications may store data that may be relevant to the user in storage/memory resources of the client.

In one or more embodiments, to provide services to the users, the clients (e.g., 110A, 110N, etc.) may utilize, rely on, or otherwise cooperate with the IN (120). For example, the clients may issue requests to the IN to receive responses and interact with various components of the IN. The clients may also request data from and/or send data to the IN (for example, the clients may transmit information to the IN that allows the IN to perform computations, the results of which are used by the clients to provide services to the users). As yet another example, the clients may utilize computer-implemented services provided by the IN. When the clients interact with the IN, data that is relevant to the clients may be stored (temporarily or permanently) in the IN.

In one or more embodiments, a client (e.g., 110A, 110N, etc.) may be capable of, e.g.: (i) collecting users' inputs, (ii) correlating collected users' inputs to the computer-implemented services to be provided to the users, (iii) communicating with the IN (120) that perform computations necessary to provide the computer-implemented services, (iv)

using the computations performed by the IN to provide the computer-implemented services in a manner that appears (to the users) to be performed locally to the users, and/or (v) communicating with any virtual desktop (VD) in a virtual desktop infrastructure (VDI) environment (or a virtualized architecture) provided by the IN (using any known protocol in the art), for example, to exchange remote desktop traffic or any other regular protocol traffic (so that, once authenticated, users may remotely access independent VDs).

As described above, the clients (e.g., 110A, 110N, etc.) may provide computer-implemented services to users (and/or other computing devices). The clients may provide any number and any type of computer-implemented services. To provide computer-implemented services, each client may include a collection of physical components (e.g., processing resources, storage/memory resources, networking resources, etc.) configured to perform operations of the client and/or otherwise execute a collection of logical components (e.g., virtualization resources) of the client.

In one or more embodiments, a processing resource (not shown) may refer to a measurable quantity of a processing-relevant resource type, which can be requested, allocated, and consumed. A processing-relevant resource type may encompass a physical device (i.e., hardware), a logical intelligence (i.e., software), or a combination thereof, which may provide processing or computing functionality and/or services. Examples of a processing-relevant resource type may include (but not limited to): a central processing unit (CPU), a graphics processing unit (GPU), a data processing unit (DPU), a computation acceleration resource, an application-specific integrated circuit (ASIC), a digital signal processor for facilitating high speed communication, etc.

In one or more embodiments, a storage or memory resource (not shown) may refer to a measurable quantity of a storage/memory-relevant resource type, which can be requested, allocated, and consumed (for example, to store sensor data and provide previously stored data). A storage/memory-relevant resource type may encompass a physical device, a logical intelligence, or a combination thereof, which may provide temporary or permanent data storage functionality and/or services. Examples of a storage/memory-relevant resource type may be (but not limited to): a hard disk drive (HDD), a solid-state drive (SSD), random access memory (RAM), Flash memory, a tape drive, a fibre-channel (FC) based storage device, a floppy disk, a diskette, a compact disc (CD), a digital versatile disc (DVD), a non-volatile memory express (NVMe) device, a NVMe over Fabrics (NVMe-oF) device, resistive RAM (ReRAM), persistent memory (PMEM), virtualized storage, virtualized memory, etc.

In one or more embodiments, while the clients (e.g., 110A, 110N, etc.) provide computer-implemented services to users, the clients may store data that may be relevant to the users to the storage/memory resources. When the user-relevant data is stored (temporarily or permanently), the user-relevant data may be subjected to loss, inaccessibility, or other undesirable characteristics based on the operation of the storage/memory resources.

To mitigate, limit, and/or prevent such undesirable characteristics, users of the clients (e.g., 110A, 110N, etc.) may enter into agreements (e.g., SLAs) with providers (e.g., vendors) of the storage/memory resources. These agreements may limit the potential exposure of user-relevant data to undesirable characteristics. These agreements may, for example, require duplication of the user-relevant data to other locations so that if the storage/memory resources fail, another copy (or other data structure usable to recover the data on the storage/memory resources) of the user-relevant data may be obtained. These agreements may specify other types of activities to be performed with respect to the storage/memory resources without departing from the scope of the embodiments disclosed herein.

In one or more embodiments, a networking resource (not shown) may refer to a measurable quantity of a networking-relevant resource type, which can be requested, allocated, and consumed. A networking-relevant resource type may encompass a physical device, a logical intelligence, or a combination thereof, which may provide network connectivity functionality and/or services. Examples of a networking-relevant resource type may include (but not limited to): a network interface card (NIC), a network adapter, a network processor, etc.

In one or more embodiments, a networking resource may provide capabilities to interface a client with external entities (e.g., the IN (120)) and to allow for the transmission and receipt of data with those entities. A networking resource may communicate via any suitable form of wired interface (e.g., Ethernet, fiber optic, serial communication etc.) and/or wireless interface, and may utilize one or more protocols (e.g., transport control protocol (TCP), user datagram protocol (UDP), Remote Direct Memory Access, IEEE 801.11, etc.) for the transmission and receipt of data.

In one or more embodiments, a networking resource may implement and/or support the above-mentioned protocols to enable the communication between the client and the external entities. For example, a networking resource may enable the client to be operatively connected, via Ethernet, using a TCP protocol to form a "network fabric", and may enable the communication of data between the client and the external entities. In one or more embodiments, each client may be given a unique identifier (e.g., an Internet Protocol (IP) address) to be used when utilizing the above-mentioned protocols.

Further, a networking resource, when using a certain protocol or a variant thereof, may support streamlined access to storage/memory media of other clients (e.g., 110A, 110N, etc.). For example, when utilizing remote direct memory access (RDMA) to access data on another client, it may not be necessary to interact with the logical components of that client. Rather, when using RDMA, it may be possible for the networking resource to interact with the physical components of that client to retrieve and/or transmit data, thereby avoiding any higher level processing by the logical components executing on that client.

In one or more embodiments, a virtualization resource (not shown) may refer to a measurable quantity of a virtualization-relevant resource type (e.g., a virtual hardware component), which can be requested, allocated, and consumed, as a replacement for a physical hardware component. A virtualization-relevant resource type may encompass a physical device, a logical intelligence, or a combination thereof, which may provide computing abstraction functionality and/or services. Examples of a virtualization-relevant resource type may include (but not limited to): a virtual server, a VM, a container, a virtual CPU (vCPU), a virtual storage pool, etc.

In one or more embodiments, a virtualization resource may include a hypervisor (e.g., a VM monitor), in which the hypervisor may be configured to orchestrate an operation of, for example, a VM by allocating computing resources of a client (e.g., 110A, 110N, etc.) to the VM. In one or more embodiments, the hypervisor may be a physical device including circuitry. The physical device may be, for example (but not limited to): a field-programmable gate array (FPGA), an application-specific integrated circuit, a programmable processor, a microcontroller, a digital signal processor, etc. The physical device may be adapted to provide the functionality of the hypervisor. Alternatively, in one or more of embodiments, the hypervisor may be implemented as computer instructions stored on storage/memory resources of the client that when executed by processing resources of the client, cause the client to provide the functionality of the hypervisor.

In one or more embodiments, a client (e.g., 110A, 110N, etc.) may be, for example (but not limited to): a physical computing device, a smartphone, a tablet, a wearable, a gadget, a closed-circuit television (CCTV) camera, a music player, a game controller, etc. Different clients may have different computational capabilities. In one or more embodiments, Client A (110A) may have 16 gigabytes (GB) of dynamic RAM (DRAM) and 1 CPU with 12 cores, whereas Client N (110N) may have 8 GB of PMEM and 1 CPU with 16 cores. Other different computational capabilities of the clients not listed above may also be taken into account without departing from the scope of the embodiments disclosed herein.

Further, in one or more embodiments, a client (e.g., 110A, 110N, etc.) may be implemented as a computing device (e.g., 400, FIG. 4). The computing device may be, for example, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the client described throughout the application.

Alternatively, in one or more embodiments, the client (e.g., 110A, 110N, etc.) may be implemented as a logical device (e.g., a VM). The logical device may utilize the computing resources of any number of computing devices to provide the functionality of the client described throughout this application.

In one or more embodiments, users (e.g., customers, administrators, organization executives, etc.) may interact with (or operate) the clients (e.g., 110A, 110N, etc.) in order to perform work-related tasks (e.g., production workloads). In one or more embodiments, the accessibility of users to the clients may depend on a regulation set by an administrator of the clients. To this end, each user may have a personalized user account that may, for example, grant access to certain data, applications, and computing resources of the clients. This may be realized by implementing the virtualization technology. In one or more embodiments, an administrator may be a user with permission (e.g., a user that has root-level access) to make changes on the clients that will affect other users of the clients.

In one or more embodiments, for example, a user may be automatically directed to a login screen of a client when the user connected to that client. Once the login screen of the client is displayed, the user may enter credentials (e.g., username, password, etc.) of the user on the login screen. The login screen may be a graphical user interface (GUI) generated by a visualization module (not shown) of the client. In one or more embodiments, the visualization module may be implemented in hardware (e.g., circuitry), software, or any combination thereof.

In one or more embodiments, a GUI may be displayed on a display of a computing device (e.g., 400, FIG. 4) using functionalities of a display engine (not shown), in which the display engine is operatively connected to the computing device. The display engine may be implemented using hardware (or a hardware component), software (or a software component), or any combination thereof. The login screen may be displayed in any visual format that would allow the user to easily comprehend (e.g., read and parse) the listed information.

In one or more embodiments, the IN (120) may include (i) a chassis (e.g., a mechanical structure, a rack mountable enclosure, etc.) configured to house one or more servers (or blades) and their components and (ii) any instrumentality or aggregate of instrumentalities operable to compute, classify, process, transmit, receive, retrieve, originate, switch, store, display, manifest, detect, record, reproduce, handle, and/or utilize any form of data for business, management, entertainment, or other purposes.

In one or more embodiments, the IN (120) may represent any enterprise information technology (IT) infrastructure at least configured to provide a smart organizational restructuring and planning strategy for debt collection agents/people (e.g., collectors), in which the IN (120) leverages reinforcement learning based methods to model sequential dynamics of the collector workforce on quarterly basis.

In one or more embodiments, the IN (120) may include functionality to, e.g.: (i) obtain (or receive) data (e.g., any type and/or quantity of input) from any source (and, if necessary, aggregate the data); (ii) perform complex analytics and analyze data that is received from one or more clients (e.g., 110A, 110N, etc.) to generate additional data that is derived from the obtained data without experiencing any middleware and hardware limitations; (iii) provide meaningful information (e.g., a response) back to the corresponding clients; (iv) filter data (e.g., received from a client) before pushing the data (and/or the derived data) to the database (135) for management of the data and/or for storage of the data (while pushing the data, the IN may include information regarding a source of the data (e.g., an identifier of the source) so that such information may be used to associate provided data with one or more of the users (or data owners)); (v) host and maintain various workloads; (vi) provide a computing environment whereon workloads may be implemented (e.g., employing linear, non-linear, and/or machine learning (ML) models to perform cloud-based data processing); (vii) incorporate strategies (e.g., strategies to provide VDI capabilities) for remotely enhancing capabilities of the clients; (viii) provide robust security features to the clients and make sure that a minimum level of service is always provided to a user of a client; (ix) transmit the result(s) of the computing work performed (e.g., real-time business insights, equipment maintenance predictions, other actionable responses, etc.) to another IN (not shown) for review and/or other human interactions; (x) exchange data with other devices registered in/to the network (130) in order to, for example, participate in a collaborative workload placement (e.g., the node may split up a request (e.g., an operation, a task, an activity, etc.) with another IN, coordinating its efforts to complete the request more efficiently than if the IN had been responsible for completing the request); (xi) provide software-defined data protection for the clients (e.g., 110A, 110N, etc.); (xii) provide automated data discovery, protection, management, and recovery operations for the clients; (xiii) monitor operational states of the clients; (xiv) regularly back up configuration information of the clients to the database (135); (xv) provide (e.g., via a broadcast, multicast, or unicast mechanism) information (e.g., a location identifier, the amount of available resources, etc.) associated with the IN to other INs of the system (100); (xvi) configure or control any mechanism that defines when, how, and what data to provide to the clients and/or database; (xvii) provide data deduplication; (xviii) orchestrate data protection through one or more GUIs; (xix) empower data owners (e.g., users of the clients) to perform self-service data backup and restore operations from their native applications; (xx) ensure compliance and satisfy different types of service level objectives (SLOs) set by an administrator/user; (xxi) increase resiliency of an organization by enabling rapid recovery or cloud disaster recovery from cyber incidents; (xxii) provide operational simplicity, agility, and flexibility for physical, virtual, and cloud-native environments; (xxiii) consolidate multiple data process or protection requests (received from, for example, clients) so that duplicative operations (which may not be useful for restoration purposes) are not generated; (xxiv) initiate multiple data process or protection operations in parallel (e.g., an IN may host multiple operations, in which each of the multiple operations may (a) manage the initiation of a respective operation and (b) operate concurrently to initiate multiple operations); (xxv) manage operations of one or more clients (e.g., receiving information from the clients regarding changes in the operation of the clients) to improve their operations (e.g., improve the quality of data being generated, decrease the computing resources cost of generating data, etc.); and/or (xxvi) perform sentiment based IR communication enhancement. In one or more embodiments, in order to read, write, or store data, the IN (120) may communicate with, for example, the database (135) and/or other storage devices in the system (100).

As described above, the IN (120) may be capable of providing a range of functionalities/services to the users of the clients (e.g., 110A, 110N, etc.). However, not all of the users may be allowed to receive all of the services. To manage the services provided to the users of the clients, a system (e.g., a service manager) in accordance with embodiments disclosed herein may manage the operation of a network (e.g., 130), in which the clients are operably connected to the IN. Specifically, the service manager (i) may identify services to be provided by the IN (for example, based on the number of users using the clients) and (ii) may limit communications of the clients to receive IN provided services.

For example, the priority (e.g., the user access level) of a user may be used to determine how to manage computing resources of the IN (120) to provide services to that user. As yet another example, the priority of a user may be used to identify the services that need to be provided to that user. As yet another example, the priority of a user may be used to determine how quickly communications (for the purposes of providing services in cooperation with the internal network (and its subcomponents)) are to be processed by the internal network.

Further, consider a scenario where a first user is to be treated as a normal user (e.g., a non-privileged user, a user with a user access level/tier of 4/10). In such a scenario, the user level of that user may indicate that certain ports (of the subcomponents of the network (130) corresponding to communication protocols such as the TCP, the UDP, etc.) are to be opened, other ports are to be blocked/disabled so that (i) certain services are to be provided to the user by the IN (120) (e.g., while the computing resources of the IN may be capable of providing/performing any number of remote computer-implemented services, they may be limited in providing some of the services over the network (130)) and (ii) network traffic from that user is to be afforded a normal level of quality (e.g., a normal processing rate with a limited communication bandwidth (BW)). By doing so, (i) computer-implemented services provided to the users of the clients (e.g., 110A, 110N, etc.) may be granularly configured without modifying the operation(s) of the clients and (ii) the overhead for managing the services of the clients may be reduced by not requiring modification of the operation(s) of the clients directly.

In contrast, a second user may be determined to be a high priority user (e.g., a privileged user, a user with a user access level of 9/10). In such a case, the user level of that user may indicate that more ports are to be opened than were for the first user so that (i) the IN (120) may provide more services to the second user and (ii) network traffic from that user is to be afforded a high-level of quality (e.g., a higher processing rate than the traffic from the normal user).

As used herein, a "workload" is a physical or logical component configured to perform certain work functions. Workloads may be instantiated and operated while consuming computing resources allocated thereto. A user may configure a data protection policy for various workload types. Examples of a workload may include (but not limited to): a data protection workload, a VM, a container, a network-attached storage (NAS), a database, an application, a collection of microservices, a file system (FS), small workloads with lower priority workloads (e.g., FS host data, operating system (OS) data, etc.), medium workloads with higher priority (e.g., VM with FS data, network data management protocol (NDMP) data, etc.), large workloads with critical priority (e.g., mission critical application data), etc.

Further, while a single IN (e.g., 120) is considered above, the term "node" includes any collection of systems or sub-systems that individually or jointly execute a set, or multiple sets, of instructions to provide one or more computer-implemented services. For example, a single IN may provide a computer-implemented service on its own (i.e., independently) while multiple other nodes may provide a second computer-implemented service cooperatively (e.g., each of the multiple other nodes may provide similar and or different services that form the cooperatively provided service).

As described above, the IN (120) may provide any quantity and any type of computer-implemented services. To provide computer-implemented services, the IN may be a heterogeneous set, including a collection of physical components/resources (discussed above) configured to perform operations of the node and/or otherwise execute a collection of logical components/resources (discussed above) of the node.

In one or more embodiments, the IN (120) may implement a management model to manage the aforementioned computing resources in a particular manner. The management model may give rise to additional functionalities for the computing resources. For example, the management model may automatically store multiple copies of data in multiple locations when a single write of the data is received. By doing so, a loss of a single copy of the data may not result in a complete loss of the data. Other management models may include, for example, adding additional information to stored data to improve its ability to be recovered, methods of communicating with other devices to improve the likelihood of receiving the communications, etc. Any type and number of management models may be implemented to provide additional functionalities using the computing resources without departing from the scope of the embodiments disclosed herein.

One of ordinary skill will appreciate that the IN (120) may perform other functionalities without departing from the scope of the embodiments disclosed herein. In one or more embodiments, the IN may be configured to perform (in conjunction with the database (135)) all, or a portion, of the functionalities described in FIGS. 3.1-3.3.

In one or more embodiments, the IN (120) may be implemented as a computing device (e.g., 400, FIG. 4). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the IN described throughout the application.

Alternatively, in one or more embodiments, similar to a client (e.g., 110A, 110N, etc.), the IN (120) may also be implemented as a logical device.

In one or more embodiments, the IN (120) may host a latent representation module (e.g., 202, FIG. 2.1), a clustering module (e.g., 216, FIG. 2.1), a reinforcement learning module (e.g., 218, FIG. 2.1), and a visualizer (e.g., 220, FIG. 2.1). Additional details of the latent representation module, clustering module, reinforcement learning module, and visualizer are described below in reference to FIG. 2.1. In the embodiments of the present disclosure, the database (135) is demonstrated as a separate entity from the IN (120); however, embodiments disclosed herein are not limited as such. The database (135) may be demonstrated as a part of the IN (e.g., as deployed to the IN).

In one or more embodiments, all, or a portion, of the components of the system (100) may be operably connected each other and/or other entities via any combination of wired and/or wireless connections. For example, the aforementioned components may be operably connected, at least in part, via the network (130). Further, all, or a portion, of the components of the system (100) may interact with one another using any combination of wired and/or wireless communication protocols.

In one or more embodiments, the network (130) may represent a (decentralized or distributed) computing network and/or fabric configured for computing resource and/or messages exchange among registered computing devices (e.g., the clients, the IN, etc.). As discussed above, components of the system (100) may operatively connect to one another through the network (e.g., a storage area network (SAN), a personal area network (PAN), a LAN, a metropolitan area network (MAN), a WAN, a mobile network, a wireless LAN (WLAN), a virtual private network (VPN), an intranet, the Internet, etc.), which facilitates the communication of signals, data, and/or messages. In one or more embodiments, the network (130) may be implemented using any combination of wired and/or wireless network topologies, and the network may be operably connected to the Internet or other networks. Further, the network (130) may enable interactions between, for example, the clients and the IN through any number and type of wired and/or wireless network protocols (e.g., TCP, UDP, IPv4, etc.).

The network (130) may encompass various interconnected, network-enabled subcomponents (not shown) (e.g., switches, routers, gateways, cables etc.) that may facilitate communications between the components of the system (100). In one or more embodiments, the network-enabled subcomponents may be capable of: (i) performing one or more communication schemes (e.g., IP communications, Ethernet communications, etc.), (ii) being configured by one or more components in the network, and (iii) limiting communication(s) on a granular level (e.g., on a per-port level, on a per-sending device level, etc.). The network (130) and its subcomponents may be implemented using hardware, software, or any combination thereof.

In one or more embodiments, before communicating data over the network (130), the data may first be broken into smaller batches (e.g., data packets) so that larger size data can be communicated efficiently. For this reason, the network-enabled subcomponents may break data into data packets. The network-enabled subcomponents may then route each data packet in the network (130) to distribute network traffic uniformly.

In one or more embodiments, the network-enabled subcomponents may decide how real-time (e.g., on the order of ms or less) network traffic and non-real-time network traffic should be managed in the network (130). In one or more embodiments, the real-time network traffic may be high-priority (e.g., urgent, immediate, etc.) network traffic. For this reason, data packets of the real-time network traffic may need to be prioritized in the network (130). The real-time network traffic may include data packets related to, for example (but not limited to): videoconferencing, web browsing, voice over Internet Protocol (VOIP), etc.

Turning now to the database (135), the database (135) may provide long-term, durable, high read/write throughput data storage/protection with near-infinite scale and low-cost. The database (135) may be a fully managed cloud/remote (or local) storage (e.g., pluggable storage, object storage, block storage, file system storage, data stream storage, Web servers, unstructured storage, etc.) that acts as a shared storage/memory resource that is functional to store unstructured and/or structured data. Further, the database (135) may also occupy a portion of a physical storage/memory device or, alternatively, may span across multiple physical storage/memory devices.

In one or more embodiments, the database (135) may be implemented using physical devices that provide data storage services (e.g., storing data and providing copies of previously stored data). The devices that provide data storage services may include hardware devices and/or logical devices. For example, the database (135) may include any quantity and/or combination of memory devices (i.e., volatile storage), long-term storage devices (i.e., persistent storage), other types of hardware devices that may provide short-term and/or long-term data storage services, and/or logical storage devices (e.g., virtual persistent storage/virtual volatile storage).

For example, the database (135) may include a memory device (e.g., a dual in-line memory device), in which data is stored and from which copies of previously stored data are provided. As yet another example, the database (135) may include a persistent storage device (e.g., an SSD), in which data is stored and from which copies of previously stored data is provided. As yet another example, the database (135) may include (i) a memory device in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data).

Further, the database (135) may also be implemented using logical storage. Logical storage (e.g., virtual disk) may be implemented using one or more physical storage devices whose storage resources (all, or a portion) are allocated for use using a software layer. Thus, logical storage may include both physical storage devices and an entity executing on a processor or another hardware device that allocates storage resources of the physical storage devices.

In one or more embodiments, the database (135) may store/record unstructured and/or structured data that may include (or specify), for example (but not limited to): an identifier of a user/customer (e.g., a unique string or combination of bits associated with a particular user); a request received from a user (or a user's account); a geographic location (e.g., a country) associated with the user; a timestamp showing when a specific request is processed by an application; a port number (e.g., associated with a hardware component of a client (e.g., 110A)); a protocol type associated with a port number; computing resource details (including details of hardware components and/or software components) and an IP address of an IN (e.g., 120) hosting an application where a specific request is processed; an identifier of an application; information with respect to historical metadata (e.g., system logs, applications logs, telemetry data including past and present device usage of one or more computing devices in the system (100), etc.); computing resource details and an IP address of a client that sent a specific request (e.g., to the IN (120)); one or more points-in-time and/or one or more periods of time associated with a data recovery event; data for execution of applications/services (including IN applications and associated endpoints); corpuses of annotated data used to build/generate and train processing classifiers for trained ML models; linear, non-linear, and/or ML model parameters (e.g., instructions to the engine (e.g., 208, FIG. 2.1) on how to train and/or fine-tune a model); an identifier of a sensor; a product identifier of a client (e.g., 110A); a type of a client; historical sensor data/input (e.g., visual sensor data, audio sensor data, electromagnetic radiation sensor data, temperature sensor data, humidity sensor data, corrosion sensor data, etc., in the form of text, audio, video, touch, and/or motion) and its corresponding details; an identifier of a data item; a size of the data item; a distributed model identifier that uniquely identifies a distributed model; a user activity performed on a data item; a cumulative history of user/administrator activity records obtained over a prolonged period of time; a setting (and a version) of a mission critical application executing on an IN (e.g., 120); an SLA/SLO set by a user; a data protection policy (e.g., an affinity-based backup policy) implemented by a user (e.g., to protect a local data center, to perform a rapid recovery, etc.); a configuration setting of that policy; product configuration information associated with a client; a number of each type of a set of assets protected by an IN (e.g., 120); a size of each of the set of assets protected; a number of each type of a set of data protection policies implemented by a user; configuration information associated with the latent representation module (e.g., 202, FIG. 2.1) (to manage security, network traffic, network access, or any other function/operation performed by the latent representation module); configuration information associated with the reinforcement learning module (e.g., 218, FIG. 2.1) (to manage security, network traffic, network access, or any other function/operation performed by the engine); a job detail of a job (e.g., a data protection job, a data restoration job, a log retention job, etc.) that has been initiated by an IN (e.g., 120); a type of the job (e.g., a non-parallel processing job, a parallel processing job, an analytics job, etc.); information associated with a hardware resource set (discussed below) of the IN (120); a completion timestamp encoding a date and/or time reflective of a successful completion of a job; a time duration reflecting the length of time expended for executing and completing a job; a backup retention period associated with a data item; a status of a job (e.g., how many jobs are still active, how many jobs are completed, etc.); a number of requests handled (in parallel) per minute (or per second, per hour, etc.) by the analyzer; a number of errors encountered when handling a job; a documentation that shows how the analyzer performs against an SLO and/or an SLA; information regarding an administrator (e.g., a high priority trusted administrator, a low priority trusted administrator, etc.) related to an analytics job; a workflow (e.g., a policy that dictates how a workload should be configured and/or protected, such as a structured query language (SQL) workflow dictates how an SQL workload should be protected) set (by a user); a type of a workload that is tested/validated by an administrator per data protection policy; a practice recommended by a vendor (e.g., a single data protection policy should not protect more than 100 assets; for a dynamic NAS, maximum one billion files can be protected per day, etc.); one or more device state paths corresponding to a device (e.g., a client); an existing knowledge base (KB) article; a technical support history documentation of a customer/user; a port's user guide; a port's release note; a community forum question and its associated answer; a catalog file of an application upgrade; details of a compatible OS version for an application upgrade to be installed; an application upgrade sequence; a solution or a workaround document for a software failure; one or more lists that specify which computer-implemented services should be provided to which user (depending on a user access level of a user); a fraud report for an invalid user; a set of SLAs (e.g., an agreement that indicates a period of time required to retain a profile of a user); information with respect to a user/customer experience; textual sentiment embeddings of comments/issues (made by one or more collectors) with respect to one or more debtors; historical workforce dynamics data (including a number of collectors who left a related organization, a number of collectors who joined to the organization, how the recovery debt action workload (or debt related workload) is distributed among collectors (after hiring newer collectors to the collector workforce), etc.); information indicating why a particular payment is delayed; collector specific information; debtor specific information; portfolio specific information; collector notes information; etc.

In one or more embodiments, collector specific information may specify (or include), for example (but not limited to): a collector's level/grade in a related organization (e.g., a high-level collector, a low-level collector, etc.); date information specifying when a collector has joined to the organization; details associated with a manager of a collector who is employed at the organization; how frequently a collector is being touch with a debtor (e.g., in order to remind a payment due); how a collector manages (or deals with) a problematic debtor (e.g., a debtor who is not making prompt payments); etc.

In one or more embodiments, debtor specific information may specify (or include), for example (but not limited to): an identifier of a debtor; a number of calls made by a collector to the debtor; a number of electronics mails sent to the debtor by the collector; the collector's friction rate with the debtor (e.g., how prompt the collector was during the collector-debtor interaction, how rude the collector was during the collector-debtor interaction, etc.); a debt amount owed against each invoice of the debtor; a number of disputes related to an invoice associated with the debtor; the debtor's previous repayment behavior, a payment risk associated with the debtor (e.g., a high-risk debtor (who have not made a single payment), a low-risk debtor, etc.); how many days a debtor's payment was delayed; whether or not the debtor paid the full debt amount; etc.

In one or more embodiments, portfolio specific information may specify (or include), for example (but not limited to): an amount of money that is being handled by a collector; a number of accounts that are being handled by the collector; a number of invoices that are being handled by the collector; a number of invoices with past due balances; a number of communication attempts performed by the collector to reach out a debtor; a risk level of a portfolio (e.g., a high-risk portfolio, a low-risk portfolio, etc.); etc.

In one or more embodiments, a portfolio may specify at least a set of debtors on which one or more collectors need to execute a set of debt recovery actions.

In one or more embodiments, as being textual in nature, collector notes information may specify (or include), for example (but not limited to): a summary of a collector-debtor interaction (e.g., that happened over a phone call); a first experience (e.g., a positive experience) of a collector resulting from the interaction; a second experience (e.g., a negative experience) of the collector resulting from the interaction; a reason specifying why a payment is delayed; a mistake detected in an invoice; Collector A does not take proper/detailed notes with respect to a set of debtors; Collector B takes proper notes with respect to a set of debtors (where proper notes taken by collectors become handy while generating a model that identifies an optimal policy that directs restructuring actions to be taken in order to maximize an expected cumulative reward function); Collector C called Debtor T five times during this month; Collector B sent six electronic mails to Debtor R to remind Debtor R about a past payment due; Collector A manages a mixed type of portfolio where Collector A engages with small entities/debtors, mid-size debtors, and large debtors; upon receiving a call from Debtor E, Collector A resolved a mistake occurred in Invoice X within a day and notified Debtor E about the actions taken to resolve the mistake; a comment noted by Collector B with respect to Debtor Y's payment behavior; an issue reported by Collector C with respect to Debtor T; etc.

In one or more embodiments, information associated with a hardware resource set (e.g., including at least resource related parameters) may specify, for example (but not limited to): a configurable CPU option (e.g., a valid/legitimate vCPU count per IN in the system (100)), a configurable network resource option (e.g., enabling/disabling single-root input/output virtualization (SR-IOV) for the IN (120)), a configurable memory option (e.g., maximum and minimum memory per IN in the system (100)), a configurable GPU option (e.g., allowable scheduling policy and/or virtual GPU (vGPU) count combinations per IN in the system (100)), a configurable DPU option (e.g., legitimacy of disabling inter-integrated circuit (I2C) for various INs in the system (100)), a configurable storage space option (e.g., a list of disk cloning technologies across one or more INs in the system (100)), a configurable storage input/output (I/O) option (e.g., a list of possible file system block sizes across all target file systems), a user type (e.g., a knowledge worker, a task worker with relatively low-end compute requirements, a high-end user that requires a rich multimedia experience, etc.), a network resource related template (e.g., a 10 GB/s BW with 20 ms latency quality of service (QOS) template), a DPU related template (e.g., a 1 GB/s BW vDPU with 1 GB vDPU frame buffer template), a GPU related template (e.g., a depth-first vGPU with 1 GB vGPU frame buffer template), a storage space related template (e.g., a 40 GB SSD storage template), a CPU related template (e.g., a 1 vCPU with 4 cores template), a memory resource related template (e.g., an 8 GB DRAM template), a vCPU count per analytics engine, a virtual NIC (vNIC) count per IN in the system (100), a wake on LAN support configuration (e.g., supported/enabled, not supported/disabled, etc.), a vGPU count per IN in the system (100), a type of a vGPU scheduling policy (e.g., a "fixed share" vGPU scheduling policy), a storage mode configuration (e.g., an enabled high-performance storage array mode), etc.

In one or more embodiments, as being telemetry data, a system log (e.g., a file that records system activities across hardware and/or software components of a client, an internal lifecycle controller log (which may be generated as a result of internal testing of a NIC), etc.) may include (or specify), for example (but not limited to): a type of an asset (e.g., a type of a workload such as an SQL database, a NAS executing on-premises, a VM executing on a multi-cloud infrastructure, etc.) that is utilized by a user; computing resource utilization data (or key performance metrics including estimates, measurements, etc.) (e.g., data related to a user's maximum, minimum, and average CPU utilizations, an amount of storage or memory resource utilized by a user, an amount of networking resource utilized by user to perform a network operation, etc.) regarding computing resources of a client (e.g., 110A); an alert that is triggered in a client (e.g., based on a failed cloud disaster recovery operation (which is initiated by a user), the client may generate a failure alert); an important keyword associated with a hardware component of a client (e.g., recommended maximum CPU operating temperature is 75° C.); a computing functionality of a microservice (e.g., Microservice A's CPU utilization is 26%, Microservice B's GPU utilization is 38%, etc.); an amount of storage or memory resource (e.g., stack memory, heap memory, cache memory, etc.) utilized by a microservice (e.g., executing on a client); a certain file operation performed by a microservice; an amount of networking resource utilized by a microservice to perform a network operation (e.g., to publish and coordinate inter-process communications); an amount of bare metal communications executed by a microservice (e.g., I/O operations executed by the microservice per second); a quantity of threads (e.g., a term indicating the quantity of operations that may be handled by a processor at once) utilized by a process that is executed by a microservice; an identifier of a client's manufacturer; media access control (MAC) information of a client; an amount of bare metal communication executed by a client (e.g., I/O operations executed by a client per second); etc.

In one or more embodiments, an alert (e.g., a predictive alert, a proactive alert, a technical alert, etc.) may be defined by a vendor of a corresponding client (e.g., 110A), by an administrator, by another entity, or any combination thereof. In one or more embodiments, an alert may specify, for example (but not limited to): a medium-level of CPU overheating is detected, a recommended maximum CPU operating temperature is exceeded, etc. Further, an alert may be defined based on a data protection policy.

In one or more embodiments, an important keyword may be defined by a vendor of a corresponding client (e.g., 110A), by a technical support specialist, by the administrator, by another entity, or any combination thereof. In one or more embodiments, an important keyword may be a specific technical term or a vendor specific term that is used in a system log.

In one or more embodiments, as being telemetry data, an application log may include (or specify), for example (but not limited to): a type of a file system (e.g., a new technology file system (NTFS), a resilient file system (ReFS), etc.); a product identifier of an application; a version of an OS that an application is executing on; a display resolution configuration of a client; a health status of an application (e.g., healthy, unhealthy, etc.); warnings and/or errors reported for an application; a language setting of an OS; a setting of an application (e.g., a current setting that is being applied to an application either by a user or by default, in which the setting may be a font option that is selected by the user, a background setting of the application, etc.); a version of an application; a warning reported for an application (e.g., unknown software exception (0xc00d) occurred in the application at location 0x0007d); a type of an OS (e.g., a workstation OS); an amount of storage used by an application; a size of an application (size (e.g., 5 Megabytes (5 MB), 5 GB, etc.) of an application may specify how much storage space is being consumed by that application); a type of an application (a type of an application may specify that, for example, the application is a support, deployment, or recycling application); a priority of an application (e.g., a priority class of an application, described below); active and inactive session counts; etc.

As used herein, "unhealthy" may refer to a compromised health state (e.g., an unhealthy state), indicating a corresponding entity (e.g., a hardware component, a client, an application, etc.) has already or is likely to, in the future, be no longer able to provide the services that the entity has previously provided. The health state determination may be made via any method based on the aggregated health information without departing from the scope of the embodiments disclosed herein.

In one or more embodiments, metadata (e.g., system logs, application logs, etc.) may be obtained (or dynamically fetched) as they become available (e.g., with no user manual intervention), or by the analyzer (e.g., 204, FIG. 2.1) polling a corresponding client (e.g., 110A) (by making schedule-driven/periodic application programming interface (API) calls to the client without affecting the client's ongoing production workloads) for newer metadata. Based on receiving the API calls from the analyzer, the client may allow the analyzer to obtain the metadata.

In one or more embodiments, the metadata may be obtained (or streamed) continuously as they generated, or they may be obtained in batches, for example, in scenarios where (i) the analyzer (e.g., 204, FIG. 2.1) receives a metadata analysis request (or a heath check request for a client), (ii) another IN of the system (100) accumulates the metadata and provides them to the analyzer at fixed time intervals, or (iii) the database (135) stores the metadata and notify the analyzer to access the metadata from the database. In one or more embodiments, metadata may be access-protected for a transmission from a corresponding client (e.g., 110A) to the analyzer (e.g., 204, FIG. 2.1), e.g., using encryption.

While the unstructured and/or structured data are illustrated as separate data structures and have been discussed as including a limited amount of specific information, any of the aforementioned data structures may be divided into any number of data structures, combined with any number of other data structures, and/or may include additional, less, and/or different information without departing from the scope of the embodiments disclosed herein.

Additionally, while illustrated as being stored in the database (135), any of the aforementioned data structures may be stored in different locations (e.g., in persistent storage of other computing devices) and/or spanned across any number of computing devices without departing from the scope of the embodiments disclosed herein.

In one or more embodiments, the unstructured and/or structured data may be updated (automatically) by third-party systems (e.g., platforms, marketplaces, etc.) (provided by vendors) and/or by the administrators based on, for example, newer (e.g., updated) versions of external information. The unstructured and/or structured data may also be updated when, for example (but not limited to): newer system logs are received, a state of the analyzer (e.g., 204, FIG. 2.1) is changed, etc.

While the database (135) has been illustrated and described as including a limited number and type of data, the database (135) may store additional, less, and/or different data without departing from the scope of the embodiments disclosed herein. One of ordinary skill will appreciate that the database (135) may perform other functionalities without departing from the scope of the embodiments disclosed herein.

While FIG. 1 shows a configuration of components, other system configurations may be used without departing from the scope of the embodiments disclosed herein.

Turning now to FIG. 2.1, FIG. 2.1 shows a diagram of an IN (200) in accordance with one or more embodiments disclosed herein. The IN (200) may be an example of the IN discussed above in reference to FIG. 1. The IN (200) includes the latent representation module (LRM) (202), the clustering module (216), the reinforcement module (218), and the visualizer (220). The IN (200) may include additional, fewer, and/or different components without departing from the scope of the embodiments disclosed herein. Each component may be operably connected to any of the other component via any combination of wired and/or wireless connections. Each component illustrated in FIG. 2.1 is discussed below.

In one or more embodiments, the LRM (202) includes/hosts the analyzer (204), a multilayer perceptron (MLP) (206), an engine (208), a cross-attention layer (210), a softmax layer (212), and an embedding fusion module (214).

In one or more embodiments, the analyzer (202) may include functionality to, e.g.: (i) receive/obtain distributed metadata (e.g., distributed logs) coming from different clients to get a logical view of all logs relevant to process a specific request (e.g., received from an administrator); (ii) use parameters/details available in distributed logs in order to, at least, (a) trace a specific request through a distributed system (e.g., 100, FIG. 1), (b) identify potential errors (e.g., performance issues) occurred while processing the specific request (e.g., which application was down while processing the specific request, what caused that application to went down, etc.), (c) trace requests that display high-latency across all applications (e.g., microservices), (d) in conjunction with the engine (208), reduce mean time to troubleshooting performance issues, (e) in conjunction with the engine (208), get immediate root cause identification of every application impact, and (f) improve user experience by re-establishing end-to-end interoperability; (iii) based on (ii), infer dependencies and connectivity among applications executing on the system (e.g., which applications are working together, which ports are open, etc.); (iv) monitor performance (e.g., a health status) of a client (e.g., 110A, FIG. 1) by obtaining telemetry data (e.g., metadata, computing resource utilization data (or key performance metrics) of hardware and/or software components, etc.) associated with the client; (v) based on (iv) and for each hardware or software component (of the client), derive a continuous average resource utilization value with respect to each computing resource; (vi) based on (iv) and for each hardware or software component (of the client), derive minimum and maximum resource utilization values with respect to each computing resource; (vii) identify health of each component based on average, minimum, and maximum resource utilization values; (viii) based on (vii), automatically react and generate alerts if one of the predetermined maximum resource utilization value thresholds is exceeded; (ix) provide identified health of each component (and, indirectly, health of the client) and generated alerts (if any) to other entities (e.g., 208) in order to manage the health of the client; and/or (x) store monitored resource utilization data and generated alerts (if any) to the database (e.g., 135, FIG. 1) to generate a resource utilization map.

In one or more embodiments, while monitoring, the analyzer (204) may need to, for example (but not limited to): inventory one or more hardware and/or software components of a client (e.g., 110A, FIG. 1); obtain type and model information of each component of a client; obtain a version of firmware or other code executing on a component of a client; obtain information specifying each component's interaction with one another in a client and/or with another component of a second client; etc.

In one or more embodiments, the analyzer (204) may derive minimum and maximum resource utilization values (with respect to each computing resource) as a reference to infer whether a continuous average resource utilization value (with respect to each computing resource) is derived properly. If there is an issue with the derived continuous average resource utilization value, based on the reference, the analyzer (204) may re-derive the continuous average resource utilization value.

In one or more embodiments, the resource utilization map may be implemented using one or more data structures that include information regarding the utilization of computing resources (e.g., a hardware resource, a software resource, a CPU, memory, etc.) of the IN (200). The resource utilization map may specify, for example (but not limited to): an identifier of a microservice, an identifier of a computing resource, an identifier of a resource that has been utilized by a microservice, etc.

The resource utilization map may specify the resource utilization by any means. For example, the resource utilization map may specify an amount of utilization, resource utilization rates over time, power consumption of applications/microservices while utilized by a user, workloads performed using microservices, etc. The resource utilization map may include other types of information used to quantify the utilization of resources by microservices without departing from the scope of the embodiments disclosed herein.

In one or more embodiments, the resource utilization map may be maintained by, for example, the analyzer (204). The analyzer (204) may add, remove, and/or modify information included in the resource utilization map to cause the information included in the resource utilization map to reflect the current utilization of the computing resources. Data structures of the resource utilization map may be implemented using, for example, lists, tables, unstructured data, structured data, etc. While described as being stored locally, the resource utilization map may be stored remotely and may be distributed across any number of devices without departing from the scope of the embodiments disclosed herein.

Further, the analyzer (204) may include functionality to, e.g.: (i) obtain/retrieve, at least, historical data from the database (e.g., 135, FIG. 1), in which the historical data includes at least a first dataset and a second dataset; and/or (ii) provide the first dataset to the MLP (206) and the second dataset to the engine (208). In one or more embodiments, the first dataset may include, for example (but not limited to): collector specific information, debtor specific information, portfolio specific information, etc. Further, the second dataset may include, for example (but not limited to): collector notes information, etc. Details of the collector specific information, debtor specific information, portfolio specific information, and collector notes information are described above in reference to FIG. 1.

One of ordinary skill will appreciate that the analyzer (204) may perform other functionalities without departing from the scope of the embodiments disclosed herein. The analyzer (204) may be implemented using hardware (e.g., any number of integrated circuits for processing computer readable instructions), software (e.g., a computer program executing on the underlying hardware of the IN (200)), or any combination thereof.

In one or more embodiments, as being an ML mechanism, the MLP (206) may include functionality to, e.g.: (i) obtain/receive the first dataset (as input) from the analyzer (204); (ii) by employing a set of linear, non-linear, and/or ML models, analyze/process the first dataset to generate latent space representation of each data specified in the first dataset; and/or (iii) provide latent space representations (or embeddings "$E_C$") associated with the first dataset to the cross-attention layer (210) (see FIG. 2.2).

One of ordinary skill will appreciate that the MLP (206) may perform other functionalities without departing from the scope of the embodiments disclosed herein. The MLP (206) may be implemented using hardware, software, or any combination thereof.

In one or more embodiments, as being an ML mechanism, the engine (208) may include functionality to, e.g.: (i) obtain/receive the second dataset (as input) from the analyzer (204); (ii) by employing a set of linear, non-linear, and/or ML models (e.g., the bidirectional long short-term memory network (BiLSTM), the bidirectional encoder representations from transformers (BERT) model, etc.), analyze/process the second dataset to generate textual "sentiment" embeddings (or textual embedding vectors); and/or (iii) provide the textual embeddings (or embeddings "$E_N$") associated with the second dataset to the cross-attention layer (210) (see FIG. 2.2).

In one or more embodiments, in order to generate textual embeddings, the engine (208) may first employ the BERT model (where necessary encoding is performed at a sentence level and sentence representations (of the second dataset) are then passed to the BiLSTM) and then employ the BiLSTM to infer/capture the contextual meaning (or the context) of the second dataset. As used herein, contextual meaning of the second dataset may refer to understanding, for example, what kind of notes a collector have noted during a collector-debtor interaction/communication and the reason behind a late payment associated with a debtor.

Further, the engine (208) may include functionality to, e.g.: (i) in conjunction with the analyzer (204), provide a useful ML-based framework to the administrator to at least assist the administrator for accurately detecting one or more anomalies in, for example, system logs (of a client) and to increase the administrator's performance (in terms of taking actions to (a) remediate hardware/software component related issues (occurred in the client) faster and/or (b) prevent any future hardware/software component related issues that may occur on the client); (ii) in conjunction with the analyzer (204) and the visualizer (220), automate at least some of the "issue detection" tasks/duties assigned to the administrator for a better administrator experience; and/or (iii) in conjunction with the analyzer (204), analyze metadata (e.g., system logs, application logs, etc.) obtained from a client (a) to identify health (or health information) of each component of the client, (b) to tag/label each component as "healthy" or "unhealthy" for troubleshooting and optimization purposes (of the client), (c) to infer an overall health status of the client, and (d) to generate a device state path for the client (e.g., from a healthy device state to an unhealthy device state) (which may be useful for the administrator to infer how a hardware component failure has occurred (in the client) and to identify the various states that the client was in).

In one or more embodiments, the engine (208) may generate a device state chain (of a client) using a device state path (which corresponds to device states up to a current device state), a current device state, and a next device state of the client. As indicated, while generating the device state chain, not just the previous device state is considered, but the whole device state path is considered. For example, the engine (208) may generate a device state chain as A→B (where B is the current device state of a client) and B→C (where A represents "fan failure", B represents "overheating of CPU", and C represents "CPU failure"). In this example, the engine (208) (i) may calculate the probability of "A→B" in the device state chain as 0.2 and (ii) may calculate the probability of "B→C" in the device state chain as 0.3, where the probability of the device state chain "A→B→C" may be calculated as 0.06.

As discussed above, the engine (208) may infer a current device state of a device (e.g., a client) based on metadata (obtained from the client), in which the current device state may indicate a device state where a hardware component failure was reported. In one or more embodiments, the engine (208) may include a list of device states (associated with the client) where the client transitioned and, among the list of device states, a next device state may be the device state that has the highest probability to become the next device state.

In one or more embodiments, the engine (208) may at least be configured to perform text vectorization entailing the translation of certain text (e.g., a sentence) to a numerical representation (or a text embedding) thereof. Any text (or textual) embedding may be expressed as a vector or array reflecting an ordered sequence of numbers, where the vector/array may be of any arbitrary size (i.e., have any number of vector/array elements). Further, each numerical value forming said text embedding may reference a dimension (i.e., often depicted as a word) within a vocabulary (i.e., any number of unique words) chosen from a corpus (i.e., collection of texts in the finance domain). The numerical values themselves may each, for example, indicate: whether the corresponding dimension/word appears in a given sentence (where the vector/array is described as sparse); or a frequency of said dimension/word that appears in the given sentence (where the vector/array is described as dense).

One of ordinary skill will appreciate that the engine (208) may perform other functionalities without departing from the scope of the embodiments disclosed herein. The engine (208) may be implemented using hardware, software, or any combination thereof.

In one or more embodiments, as being an attention mechanism in a transformer architecture (which may mix/combine two different embedding sequences (of different modalities such as text, image, sound, etc.) that have the same dimension), the cross-attention layer (210) may include functionality to, e.g.: (i) obtain/receive (a) the latent space representations (or embeddings "$E_C$") associated with the first dataset from the MLP (206) and (b) the textual embeddings (or embeddings "$E_N$") associated with the second dataset from the engine (208); (ii) in conjunction with the softmax layer (212) and the embedding fusion module (214), fuse the latent space representations with the textual embeddings to generate one or more final/fused embeddings ("H", see FIG. 2.2) that share the same latent space; and/or (iii) provide the final embeddings to the clustering module (216).

In one or more embodiments, in conjunction with the softmax layer (212) and the embedding fusion module (214), the cross-attention layer (210) (i) may fuse the latent space representations with the textual embeddings in order to capture the association between the textual embeddings and the latent space representations and (ii) may generate final embeddings that share the same latent space to identify same feature sharing collectors. For example, some collectors (Collectors A and B) are able to handle high-risk debtors in a prompt manner and some collectors (Collectors C and D) are not able to handle high-risk debtors in a prompt manner (e.g., these collectors need at least 3-5 days to handle high-risk debtors). Based on this, (i) first final embeddings related to Collectors A and B (that share the same latent space) may be generated because Collectors A and B are sharing the "promptness" feature and (i) second final embeddings related to Collectors C and D (that share the same latent space) may be generated because Collectors A and B are sharing the "non-promptness" feature.

Further, the process of fusing the latent space representations with the textual embeddings can be represented as follows (for more details, see FIG. 2.2):

(i) $E_C$=MLP($D_c$), $D_c \in \{D_{job}, D_{portfolio}, D_{relationship}\}$, where $D_c$ denotes a metric and $E_C$ denotes a collector embedding, (ii) $e_{s_i}$=BERT($s_i$), $s_i \in D_{notes}$, where i denotes a sentence and the BERT model will understand the context/meaning of each sentence, $$E_n = [E^f, E^b] = [BiLSTM(s_i, E_{i-1}^f), BiLSTM(s_i, E_{i+1}^b)], \quad \text{(iii)}$$

where $E_N$ denotes a textual embedding generated for a feature (e.g., "collect money", "take money", etc.) extracted from a sentence, $$W_c = \text{softmax}(E_n \cdot E_C^T); W_n = \text{softmax}(E_c \cdot E_n^T), \quad \text{(iv)}$$

where $W_C$ represents the output obtained after applying softmax function (by the softmax layer (212)) to $E_C$ and $W_N$ represents the output obtained after applying softmax function (by the softmax layer (212)) to $E_N$, (v) H=[[$W_c$, $E_n$*$E_c$], [$W_n$, $E_c$*$E_n$]], where * represents a dot product.

As indicated by the fusing process above, a fused embedding H is a collective representation of collector features (including, at least, collector specific information, portfolio specific information, and collector notes information), debtor features (including, at least, debtor specific information), and collector-debtor relationship features (including, at least, how frequently a collector get in touch with a debtor, whether or not the collector convince the debtor to make a late payment, etc.) in the latent space.

Further, the fused embeddings are obtained at a collector level granularity and are used by the clustering module (216)

to generate clusters/groups of collectors with similar features (e.g., promptness to manage a high-risk debtor, non-promptness to manage a high-risk debtor, etc.). As described in more details below, the collector groups are then used by the reinforcement learning module (218) to perform one or more restructuring actions to achieve operational and strategic goals of a related organization. For example, the movement of collectors among different collector clusters are modelled by Markov chains.

One of ordinary skill will appreciate that the cross-attention layer (210), the softmax layer (212), and the embedding fusion module (214) may perform other functionalities without departing from the scope of the embodiments disclosed herein. The cross-attention layer (210), the softmax layer (212), and the embedding fusion module (214) may be implemented using hardware, software, or any combination thereof.

In one or more embodiments, the clustering module (216) may include functionality to, e.g.: (i) obtain/receive one or more fused embeddings from the LRM (202) (more specifically, from the cross-attention layer (210)); (ii) by employing a set of linear, non-linear, and/or ML models, analyze the fused embeddings; (iii) based on (ii), identify collectors that share one or more similar features; (iv) based on (iii), generate groups of collectors with similar features in embedding/latent space, in which each group should include an optimal number of collectors and each collector should be assigned with an optimal difficulty portfolio (e.g., a portfolio that is not very complex or very easy to manage) based on his/her expertise and profile; and/or (v) provide the groups/clusters of collectors to the reinforcement learning module (218).

In one or more embodiments, the clustering module (216) may generate groups of collectors with similar features in the latent space as opposed to performing grouping in the original feature space because grouping in the latent space reduces the dependence on the efficiency of the algorithm on quality of data. In addition, by using clustering/grouping in the latent space, the clustering module (216) may capture complimentary information from different views and multiple modalities of input data (e.g., not just information related to a collector's portfolio, but also information about the collector, a debtor, and information about the collector's relationship with debtor).

As described in more details below, collector clusters are used by the reinforcement learning module (218) to perform one or more restructuring actions to achieve operational and strategic goals of the organization, in which collector clusters are generated in such a way that the collectors in a particular cluster belong to the same grade/level.

In one or more embodiments, the clustering module (216) may measure the similarity between a cluster centroid (or the center of a cluster) and data/embedded points (e.g., related fused embeddings) using the t-distribution kernel approach. The probability of assigning an embedded point to a cluster is measured (by the clustering module (216)) as a probability using the similarity measure. Further, the clustering module (216) may learn a cluster centroid by minimizing the Kullback-Leibler (KL) divergence loss between the similarity probability measure and an auxiliary target distribution (so that collectors that have similar portfolios (and profiles) can be clustered). The aforementioned process (performed by the clustering module (216)) can be represented as follows:

(i) initial cluster centroids $\mu_i$ for cluster i, $z_j \in H$, where $z_j$ denotes a part/set of the fused embeddings, $$q_{ji} = \frac{(1 + \|z_j - \mu_i\|^2)^{\left(\frac{\alpha+1}{2}\right)}}{\sum_{i'}(1 + \|z_j - \mu_{i'}\|^2)^{\left(\frac{\alpha+1}{2}\right)}}, \quad \text{(ii)}$$

where $q_{ji}$ represents the probability of assigning a sample j to cluster i, $$p_{ji} = \frac{q_{ji}^2 / \sum_j q_{ji}}{\sum_{i'} q_{ji'}^2 / \sum_{j'} q_{ji'}}, \quad \text{(iii)}$$

where p represents the target distribution, $$L = KL(P\|Q) = \sum_i \sum_j p_{ij} \log \frac{p_{ij}}{q_{ij}} \quad \text{(iv)}$$

is the KL divergence loss between the target distribution p and the learnt distribution q, (v) $C_i \in C = C_1, C_2, \ldots, C_n$, where $C_i$ represents the index set of the collectors in a particular cluster i.

One of ordinary skill will appreciate that the clustering module (216) may perform other functionalities without departing from the scope of the embodiments disclosed herein. The clustering module (216) may be implemented using hardware, software, or any combination thereof.

In one or more embodiments, the reinforcement learning module (218) may include functionality to, e.g.: (i) obtain/receive groups/clusters of collectors from the clustering module (216); (ii) by employing a set of linear, non-linear, and/or ML models, analyze the groups of collectors, at least, to infer sequential dynamics of the collectors; (iii) generate, by employing a Markov decision process, a model that identifies an optimal policy that directs restructuring actions to be taken in order to maximize an expected cumulative reward function (e.g., a long-term reward function); (iv) based on, at least, the sequential dynamics, train the model to generate a trained model that ensures that the groups of collectors are structured/restructured in such a way that the organization's goals are satisfied in different conditions; and/or (v) initiate, via the visualizer (220), notification of a user/administrator about the trained model.

As described above, the reinforcement learning module (218) may model the sequential dynamics of collector workforce as a Markov chain and may generate workforce restructuring strategies using reinforcement learning approaches (e.g., learning to take restructuring actions that maximize the reward function). In one or more embodiments, the clusters of collectors that are neighboring each other (and thus represent similar behaviors to each other) may be obtained from the clustering module (216). Further, restructuring actions (on collector groups), state representations, and formulation of the reward function may affect the collectors at a collector cluster level and the sequential dynamics of the collector workforce are modelled (by the reinforcement learning module (218)) in terms of these collector groups in order to move one or more collectors among different clusters. In this way, the reinforcement learning module (218) may tame the expansion in state space and action space when modelled at an individual collector level so that the reinforcement learning module (218) may have a higher level of control than modelling collectors at an overall level.

In one or more embodiments, the reinforcement learning module (218) may employ policy optimization methods (e.g., penalizing, rewarding, etc.) based on, at least, historical workforce dynamics data (e.g., obtained from the database (e.g., 135, FIG. 1)) to infer/learn a related policy function (e.g., to fine-tune the trained model). For example, if the trained model predicted a wrong number of collectors in a particular cluster, the reinforcement learning module (218) may penalize the trained model and then fine-tune the trained model. As yet another example, if the trained model distributed the workload unequally among collectors in a particular cluster, the reinforcement learning module (218) may penalize the trained model and then fine-tune the trained model.

As described above, the reinforcement learning module (218) may generate restructuring actions on collectors (in related clusters) and may aim to optimize the long-term reward function, which represents the organization's strategic goals and organizational mandates. The reinforcement learning module (218) may not only perform organizational restructuring actions, but also prescribes optimal redistribution of workloads after restructuring (e.g., across the organization) to ensure continued high-productivity and smooth flow of operations of the organization.

Said another way, the reinforcement learning module (218) may model the organizational restructuring strategy in the reinforcement learning setting where the organizational restructuring actions are performed in such a way that these actions are modified according to the organizational mandates and strategic goals (of the organization) to generate/make better long-term decisions.

In one or more embodiments, the value that may be derived out of restructuring the organization at instance t may be learnt using reinforcement learning. Because of the sequential dynamics of the collector workforce, the reinforcement learning module (218) may model the interactions between the organization and the workforce as a Markov decision process and the process can be represented as follows:

(i) State Space: The state denoted by $s_t$ (see FIG. 2.3) is a feature vector that describes the current composition of collector workforce in different collector clusters, the number of people in different collector clusters, newly hired collectors at the instance t, and the current levels of attrition and internal movement with the organization. The state space may represent all possible combinations of the total collector workforce into the collector clusters, in which the minimum number of collectors per cluster is kept at unity, while the maximum number of collectors per cluster is held at total number of collectors. In one or more embodiments, the cluster level state space mapping (a) may help in reducing state space expansion that would have occurred if collectors have been modelled at an individual level and (b) may provide a variable degree of control as the collector limit per cluster can be modified to generate restructuring strategies with different degrees of control and granularity. The below table (i.e., Table 1) shows a non-exhaustive list of features used for the state space.

TABLE 1

Features in State Representation

| Name/Identifier | Description |
|---|---|
| Collector Clusters | The cluster groups of collectors based on collector, debtor, and collector-debtor relationship latent features, $C_i^t \in C = C_1^t, C_2^t, \ldots, C_n^t$, where $C_i^t$ represents the index set of the collectors in a particular cluster i at instance t. |
| Collector Headcount Distribution | The number of collectors in each of the different clusters at a particular instance t, $$G_i^t = \frac{|C_i^t|}{|C_{max}^t|}, G = \left\{ \frac{|C_1^t|}{|C_{max}^t|}, \frac{|C_2^t|}{|C_{max}^t|}, \ldots, \frac{|C_n^t|}{|C_{max}^t|} \right\}$$ |
| Collector Headcount Minimum | The minimum number of collectors per cluster to be maintained $$G_i^{t,min} = 1 \forall\ i \in n.$$ |
| Collector Headcount Maximum | The maximum number of collectors per cluster to be maintined $$G_i^{t,max} = N_c \forall\ i \in n.$$ |
| Collector Attrition Levels | The number of collectors Ot who leave the organization organically and not due to restructuring actions at instance t. |
| Collector Internal Movement Levels | The number of collectors Mt who move between different clusters organically and not due to restructuring actions at instance t. |
| Day/Week/Quarter | Seasonality features of the instance for which the workforce management activities are performed. |

(ii) Action Space: The action is continuous and is representative of the restructuring actions that can be taken by the organization. The organization's strategic goals and mandates that often call for restructuring actions include, e.g.:

$$L_t = \max(0, N_{op}^t)$$

$$H_t = \max(0, N_h^t)$$

$$N_t = \begin{pmatrix} \max(0, N_{c_1}^t) & \cdots & \max(0, N_{c_j}^t) \\ \vdots & \ddots & \vdots \\ \max(0, N_{c_k}^t) & \cdots & \max(0, N_{c_n}^t) \end{pmatrix}_{n \times n}$$

where $L_t$ represents the number of collectors who are to leave the organization due to restructuring, $H_t$ represents the number of newly hired collectors, and $N_t$ represents the movement of the collectors from one cluster to another due to restructuring at instance t. The parameters $N_{op}^t, N_h^t,$ and $N_{c_i}^t$ are the upper limits, which are to be set by domain experts (or administrators) and can be modified to obtain the optimal collector quantity in order to achieve strategic goals of the organization.

(iii) Reward: The reward (or the reward function) $r(s_t)$ (see FIG. 2.3) received by the reinforcement learning module (218) at instance t depends on the organizational goals and restructuring actions' impact on the reward function. The reward function is designed to ensure that the collector workforce is restructured in such a way that the collection operations are not affected and one or more debtor cases of collectors who have left the organization (e.g., extra workloads) are reallocated optimally (among collectors in different clusters). The reward function is defined as follows (for more details, see FIG. 2.3):

$$r_{b_n}(s_t) := -\sum_{i=1}^{n} 1_{G_{i,t} \notin [0, B_{N,i}]}$$

$$r_{b_d}(s_t) := -\sum_{i=1}^{n} 1_{G_{i,t} \notin [0, B_{D,i}]}$$

$$r_{b_e}(s_t) := -\sum_{i=1}^{n} 1_{G_{i,t} \notin [0, B_{E,i}]}$$

$$r_{b_c}(s_t) := -\sum_{i=1}^{n} 1_{G_{i,t} \notin [0, B_{c,i}]} \; \forall \, c \in \{h, m, l\}$$

$$r_{b_{op}}(s_t) := \begin{cases} -1, & op(G^t) < \alpha * op(N_c) \\ 0, & op(G^t) \geq \alpha * op(N_c) \end{cases}$$

$$op(G^t) = \sum_{i=1}^{N} G_i^t \cdot P_i^t$$

$$Z_t = \Delta(z_t, z_{t-1}) =$$

$$[I_i^t * PD_i^t + (1 - I_i^t) * \beta * PD_i^t] - [I_i^{t-1} * PD_i^{t-1} + (1 - I_i^{t-1}) * \beta * PD_i^{t-1}]$$

$$r_{b_z}(s_t) := \begin{cases} -1, & Z_t \geq 0 \\ 0, & Z_t < 0 \end{cases}$$

$$r(s_t) = r_{b_n}(s_t) + r_{b_d}(s_t) + r_{b_e}(s_t) + r_{b_c}(s_t) + r_{b_{op}}(s_t) + r_{b_z}(s_t)$$

where $r_b$ represents bound penalties, which provide a unit negative penalty whenever collector cluster metrics are outside the set limits. $r_{b_n}$ represents the bound on the number of collectors to be grouped into a cluster, in which a negative penalty (e.g., a no. of collectors bound penalty, see FIG. 2.3) is issued when the number of collectors does not respect the set bounds (e.g., Nc, which indicates the upper bound for the number of collectors). $r_{b_d}$ represents the bound on the amount of dollars to be handled by collectors grouped into a cluster, in which a negative penalty (e.g., a dollar value bound penalty, see FIG. 2.3) is issued when the amount of dollars handled does not respect the set bounds.

Further, $r_{b_e}$ represents the bound on the number of engagements to be handled by collectors grouped into a cluster, in which a negative penalty (e.g., an engagement bound penalty, see FIG. 2.3) is issued when the number of engagements handled does not respect the set bounds. $r_{b_c}$ represents the bound on the number of high-, medium-, low-level complexity cases to be handled by collectors grouped into a cluster, in which a negative penalty (e.g., a collector complexity bound penalty, see FIG. 2.3) is issued when the number of engagements handled does not respect the set bounds. The upper bounds $B_{N,i}$, $B_{D,i}$, $B_{E,i}$, and $B_{C,i}$ are estimated for current instance t based on the historical collector data (e.g., obtained from the database (e.g., 135, FIG. 1)). Moreover, $r_{b_{op}}$ represents the bound on OpEx reduction to be achieved by collectors rearrangement into a cluster, in which a negative penalty (e.g., an OpEx bound penalty, see FIG. 2.3) is issued when the OpEx reduction is less than the targeted reduction in OpEx defined by parameter a with respect to current workforce composition.

In one or more embodiments, the reallocation of collector cases/workloads among the restructured workforce is crucial to keep the collection operations unaffected. To this end, the reward $r_{b_z}$ measures the improvement in an objective $z_t$ with respect to past instance "t−1", in which the objective $z_t$ allocates the non-selected collectors past due amount ($PD_i^t$) to be collected at a rate of $\beta$ that represents the average collection rate of the overall collector workforce after restructuring (where $P_i^t$ represents the target distribution). Further, $I_t$ is a one-hot representation of the collectors who are included in the workforce planning at instance t, with zeros to represent collectors who are not present in the current plan. As indicated, the goal of the reinforcement learning module (218) is to minimize the past due amount (or the amount of debt that has not been paid) even after passing the due date for payment. Thus, the reinforcement learning module (218) employs a negative penalty (e.g., a past due gradient penalty, see FIG. 2.3) when the objective increases with respect to past instances.

Referring to FIG. 2.3, the cumulative reward r ($s_t$) is a sum of various sub-rewards (e.g., $r_{b_n}(s_t)$, $r_{b_d}(s_t)$, $r_{b_e}(s_t)$, $r_{b_c}(s_t)$, $r_{b_{op}}(s_t)$, and $r_{b_z}(s_t)$), which may be a negative reward (e.g., a penalty) or a positive reward. The key novelty here is that as opposed to existing solutions that focus on simple and specific settings (e.g., homogeneous non-dynamic workforce details), which require deep understanding of the organization's goals and mandates, the reinforcement learning module (218) provides a stand-alone and robust restructuring strategy that may learn dynamically from interactions (e.g., collector-debtor interactions) and may not require extensive domain knowledge/expertise to identify the optimal restructuring strategy. Further, another key novelty here is that while traditional approaches use optimization techniques (where the optimization objectives and constraints need to be linear in order to be solved easily), due to the nature of the reinforcement learning problem formulation, the reinforcement learning module (218) does not need to meet these conditions to identify the optimal restructuring strategy (e.g., the optimal collector workforce restructuring strategy, the optimal policy, etc.).

In one or more embodiments, the reinforcement learning module (218) may employ the aforementioned Markov decision process to learn/infer the optimal policy $\pi(a_t|s_t)$ that prescribes the restructuring actions to be taken when in state $s_t$ so that the expected cumulative reward function can be maximized. To this end, the reinforcement learning module (218) may employ a policy iteration method/approach (e.g., $\theta_{k+1} = \theta_k + \delta \nabla_\theta J(\pi_\theta)|\theta_k$) to directly learn the policy (e.g., policy evaluation) and improve the learned policy (e.g., policy improvement via fine-tuning the trained model).

The aforementioned action value function is maximized (by the reinforcement learning module (218)) to obtain optimal actions and optimal policy $\pi^*$ as follows:

$$\nabla_\theta J(\pi_\theta) = E\left[\sum_{t=0}^{T} \nabla_\theta \log \pi_\theta(a_t|s_t) A_t\right]$$

where $\pi(a|s)$ is parameterized by one or more deep neural networks and learnt iteratively through reinforcement learning, and $A_t$ represents the advantage function (which is used to decide when to penalize the optimal restructuring strategy and/or fine-tune the trained model).

One of ordinary skill will appreciate that the reinforcement learning module (218) may perform other functionalities without departing from the scope of the embodiments disclosed herein. The reinforcement learning module (218) may be implemented using hardware, software, or any combination thereof.

In one or more embodiments, the engine (208) may initiate, for example, displaying of (i) identified/tagged health of a corresponding client, (ii) a holistic user profile of a user of the client, and/or (iii) analyzer generated alerts to an administrator via the visualizer (220) (e.g., via a GUI, an API, a programmatic interface, and/or a communication channel of the visualizer) to indicate an overall health status of the client. In one or more embodiments, for example, (i) each data item (e.g., identified health of the client, an analyzer generated alert, etc.) may be displayed (e.g., highlighted, visually indicated, etc.) with a different color (e.g., red color tones may represent a negative overall health status of the client, green color tones may represent a positive overall health status of the client, etc.), and (ii) one or more useful insights/recommendations with respect to the overall health status of the client may be displayed in a separate window(s) on the visualizer (220) to assist the administrator while managing the overall health status of the client (e.g., for a better administrator experience, to help the administrator with respect to understanding the benefits and tradeoffs of selecting different troubleshooting options, etc.).

Further, the visualizer (220) may include functionality to, e.g.: (i) obtain (or receive) data (e.g., any type and/or quantity of input) from any source (e.g., a user via a client (e.g., 110A, FIG. 1), the engine (208), the reinforcement learning module (218), etc.) (and, if necessary, aggregate the data); (ii) based on (i) and by employing a set of linear, non-linear, and/or ML models, analyze, for example, a query to derive additional data; (iii) encompass hardware and/or software components and functionalities provided by the IN (200) to operate as a service over the network (e.g., 130, FIG. 1) so that the visualizer (220) may be used externally; (iv) employ a set of subroutine definitions, protocols, and/or hardware/software components for enabling/facilitating communications between, for example, the engine (208) and external entities (e.g., clients, administrators, etc.); (v) by generating one or more visual elements, allow an administrator to, at least, interact with a user of a corresponding client; (vi) receive a customer/user profile of a customer and display the customer profile to an administrator (e.g., for monitoring and/or performance evaluation); (vii) concurrently display one or more separate windows, for example, on its GUI; and/or (viii) generate visualizations of the method illustrated in FIGS. 3.1-3.3.

One of ordinary skill will appreciate that the visualizer (220) may perform other functionalities without departing from the scope of the embodiments disclosed herein. The visualizer (220) may be implemented using hardware, software, or any combination thereof.

In one or more embodiments, the IN (200) may further include an interface, that refers to networking hardware (e.g., a network card or adapter), a computer program implementing a logical interface (e.g., an API), an interactivity protocol, or any combination thereof, at least configured to enable or facilitate communications (or information exchange) between the components of the IN (200) and other entities (e.g., any client(s) (see e.g., FIG. 1)).

In one or more embodiments, the LRM (202), the clustering module (216), the reinforcement learning module (218), and the visualizer (220) may be utilized in isolation and/or in combination to provide the aforementioned functionalities. These functionalities may be invoked using any communication model including, for example, message passing, state sharing, memory sharing, etc.

Turning now to FIG. 2.2, FIG. 2.2 shows an example latent representation flow in accordance with one or more embodiments disclosed herein. Details of the example latent representation flow are described above in reference to FIG. 2.1.

Turning now to FIG. 2.3, FIG. 2.3 shows an example reward formulation in accordance with one or more embodiments disclosed herein. Details of the example reward formulation are described above in reference to FIG. 2.1.

FIGS. 3.1-3.3 show a method for managing restructuring of an organization (e.g., managing collector people resources of the organization to deal with customers/debtors and to enhance collector-debtor relationships) in accordance with one or more embodiments disclosed herein. While various steps in the method are presented and described sequentially, those skilled in the art will appreciate that some or all of the steps may be executed in different orders, may be combined or omitted, and some or all steps may be executed in parallel without departing from the scope of the embodiments disclosed herein.

Turning now to FIG. 3.1, the method shown in FIG. 3.1 may be executed by, for example, the above-discussed the LRM (e.g., 202, FIG. 2.1), the clustering module (e.g., 216, FIG. 2.1), the reinforcement learning module (e.g., 218, FIG. 2.1), and the visualizer (e.g., 220, FIG. 2.1). Other components of the system (100) illustrated in FIG. 1 may also execute all or part of the method shown in FIG. 3.1 without departing from the scope of the embodiments disclosed herein.

In Step 300, the analyzer obtains historical data from the database (e.g., 135, FIG. 1), in which the historical data may include, at least, a first dataset and a second dataset. Details of the first dataset and the second dataset are described above in reference to FIG. 2.1.

In one or more embodiments, before obtaining the historical data, the analyzer may invoke the database to communicate with the database. After receiving the database's confirmation, the analyzer may obtain the historical data from the database. The historical data may be obtained continuously or at regular intervals (e.g., every two minutes) (without affecting production workloads of the database and the analyzer). Further, the historical data may be access-protected for the transmission from, for example, the database to the analyzer, e.g., using encryption.

In one or more embodiments, the historical data may be obtained as it becomes available or by the analyzer polling the database (via one or more API calls) for newer information. For example, based on receiving an API call from the analyzer, the database may allow the analyzer to obtain newer information.

In Step 302, the analyzer provides the first dataset to the MLP (e.g., 206, FIG. 2.1) (which is part of the LRM) and the second dataset to the engine (e.g., 208, FIG. 2.1) (which is part of the LRM). In Step 304, upon receiving the first dataset and by employing a set of linear, non-linear, and/or ML models, the MLP processes the first dataset to generate latent space representations of data specified in the first dataset. Thereafter, in Step 306, the MLP provides the latent space representations of the data to the cross-attention layer (e.g., 210, FIG. 2.1) (which is part of the LRM).

In Step 308, upon receiving the second dataset and by employing a set of linear, non-linear, and/or ML models, the engine processes the second dataset to generate one or more textual embeddings. Thereafter, in Step 310, the engine provides the textual embeddings to the cross-attention layer. In Step 312, (i) upon receiving the latent space representations and the textual embeddings and (ii) by employing a set of linear, non-linear, and/or ML models, the cross-attention layer (in conjunction with the softmax layer (e.g., 212, FIG. 2.1) and the embedding fusion module (e.g., 214, FIG. 2.1)) fuses the latent space representations and the textual embeddings to generate final/fused embeddings that share the same latent space. Thereafter, in Step 314, the cross-attention layer provides the final embeddings to the clustering module.

Turning now to FIG. 3.2, the method shown in FIG. 3.2 may be executed by, for example, the above-discussed the LRM, the clustering module, the reinforcement learning module, and the visualizer. Other components of the system (100) illustrated in FIG. 1 may also execute all or part of the method shown in FIG. 3.2 without departing from the scope of the embodiments disclosed herein.

In Step 316, (i) upon receiving the final embeddings (in Step 314 of FIG. 3.1) and (ii) by employing a set of linear, non-linear, and/or ML models, the clustering module analyzes the final embeddings. In Step 318, based on Step 316 (and/or based on the final embeddings), the clustering module identifies one or more collectors that share similar features. In one or more embodiments, similar features may include, for example (but not limited to): a collector's job profile within an organization; a number of calls handled by a collector; a number of communication attempts performed by a collector to reach out a debtor; promptness of the collector to maintain a satisfactory collector-debtor interaction; etc.

In Step 320, based on Step 318, the clustering module generates groups of collectors with similar features (e.g., promptness, taking more than required debtor calls, being high-level collector person, jotting down each detail during a collector-debtor interaction, dealing with more than required high-risk debtors, etc.) in embedding space. For example, the clustering module may generate a first group of collectors with first similar features and a second group of collectors with second similar features. Thereafter, in Step 322, the clustering module provides the groups of collectors to the reinforcement learning module. In Step 324, (i) upon receiving the groups of collectors (in Step 322) and (ii) by employing a set of linear, non-linear, and/or ML models, the reinforcement learning module analyzes the groups of collectors, at least, to infer sequential dynamics of the collectors.

For example, as a result of the analysis, the reinforcement learning module may infer a first sequential dynamic of the first group of collectors and a second sequential dynamic of the second group of collectors. In one or more embodiments, the first sequential dynamic may represent, at least, a first number collectors within the first group of collectors who are to leave the organization and the second sequential dynamic may represent, at least, a second number of collectors within the second group of collectors who are moved from the first group of collectors to the second group of collectors because of a restructuring in the organization.

In Step 326, by employing a Markov decision process (see FIGS. 2.1 and 2.3), the reinforcement learning module generates a model that identifies an optimal policy that directs one or more restructuring actions (e.g., performing an OpEx reduction with the collector workforce)) to be taken in order to maximize a reward function. In one or more embodiments, the Markov decision process may consider, at least, sequential dynamics of the collector workforce on a quarterly basis in order to generate a set of workforce restructuring strategies based on the organization's goals. Further, the reward function may represent the organization's strategic goals and may ensure that the collector workforce is restructured without affecting debt collection operations across the organization.

In Step 328, based on the sequential dynamics, the reinforcement learning module trains the model to generate a trained model that ensures that the groups of collectors are structured/restructured in such a way that the organization's goals are satisfied in different conditions. Thereafter, in Step 330, the reinforcement learning module initiates, via the visualizer, notification of a user/administrator about the trained model. In one or more embodiments, the method may end following Step 330.

Turning now to FIG. 3.3, the method shown in FIG. 3.3 may be executed by, for example, the above-discussed the LRM, the clustering module, the reinforcement learning module, and the visualizer. Other components of the system (100) illustrated in FIG. 1 may also execute all or part of the method shown in FIG. 3.3 without departing from the scope of the embodiments disclosed herein.

In Step 332, the reinforcement learning module receives an organization-wide collector workforce restructuring request from a requesting entity (e.g., an administrator of the IN (e.g., 200, FIG. 2.1) via GUI (or the visualizer), an administrator terminal, an application, etc.) that wants to manage the collector people resource of the organization. In Step 334, in response to receiving the request, as part of that request, and/or in any other manner (e.g., before initiating any computation with respect to the request), the reinforcement learning module obtains current groups of collectors from the cluster module.

In Step 336, by employing the trained model, the reinforcement learning module analyzes one or more details associated with the current groups of collectors. In Step 338, based on the details, the reinforcement learning module makes a determination (in real-time or near real-time) as to whether a restructuring action is needed to be applied. Accordingly, in one or more embodiments, if the result of the determination is NO, the method proceeds to Step 340. If the result of the determination is YES (which indicates the number of collectors in related clusters should be restructured because of newly hired collectors, the debtor related workload should be reallocated across the clusters because of collectors that recently left the organization, etc.), the method alternatively proceeds to Step 342.

In Step 340, as a result of the determination in Step 338 being NO, the reinforcement learning module initiates, via the visualizer, notification of the administrator to indicate that no collector workforce restructuring is necessary to continue satisfying the organization's goals (e.g., at least from the perspective of profitability such as gains and losses). In one or more embodiments, the method may end following Step 340.

In Step 342, as a result of the determination in Step 338 being YES, the reinforcement learning module initiates applying one or more restructuring actions to continue satisfying the organization's goals. In one or more embodiments, the restructuring actions may need to be applied, for example, in order to maintain a minimum number of collectors per group and in order to make sure that each collector in each group has an optimal number of portfolios to manage.

In Step 344, based on Step 342, the reinforcement learning module initiates, via the visualizer, displaying of the applied restructuring actions to the administrator. In one or more embodiments, the method may end following Step 344.

As described above, the LRM (e.g., 202, FIG. 2.1) generates latent space representations of collector features (e.g., collector specific information, portfolio specific information, etc.), debtor features (e.g., debtor specific information), and textual embeddings from collector notes (e.g., collector notes information) about the collector-debtor interactions as opposed to leveraging just quantitative features that represent the collector alone. The corresponding embeddings (e.g., $E_C$ and $E_N$, see FIG. 2.2) are then fused using the cross-attention layer (e.g., 210, FIG. 2.1), the softmax layer (e.g., 212, FIG. 2.1), and the embedding fusion module (e.g., 214, FIG. 2.1) to derive a unified representation of the collector features, debtor features, and the collector-debtor relationship features in a common latent space. This is crucial to develop a holistic representation of the collection workforce from multiple views, so that (i) the importance of a collector is not just evaluated based on quantitative metrics and (ii) restructuring actions are performed holistically.

As described above, the clustering module (e.g., 216, FIG. 2.1) generates groups of similar collectors based on fused embeddings generated by the LRM. As opposed to performing clustering on the original feature space, clustering in the latent space reduces the dependence on the efficiency of the algorithm on quality of original data. In addition, by performing clustering in the latent space, the framework can generate clusters that are capable of capturing complimentary information from different views and multiple modalities of input data.

As described above, the framework generates restructuring actions on the collectors in these clusters and aims to optimize a long-term reward function, which represents a related organization's strategic goals and organizational mandates. The framework does not only perform organizational restructuring actions, but also prescribes optimal re-distribution of debtor related workloads after restructuring to ensure continued high-productivity and smooth flow of operations across the organization. The framework also provides a variable degree of control through different parameters that can be modified by domain experts to generate restructuring strategies with different degrees of control and granularity.

As described above, the reward function accounts for optimal allocation of collectors to clusters, the amount of dollars to be handled by the collectors, the number of accounts to be handled, the complexity of debtor related workloads, and other metrics for restructuring such as, but not limited to, OpEx reduction and reallocation of the workloads. In one or more embodiments, the reward function can be formulated in various ways by assigning weights to different parameters that an administrator wishes to optimize. Further, the administrator can formulate the state space and the action space in various ways to optimize different objectives as deemed necessary by the organization.

As described above, as opposed to existing approaches that focus on simple and specific settings, such as homogeneous non-dynamic workforce, and require deep understanding of the organization's goals and mandates, the framework develops a stand-alone and robust restructuring strategy that can learn dynamically from collector-debtor interactions and does not require extensive domain knowledge to identify the optimal restructuring strategy. Further, while existing methods use optimization techniques (where the optimization objectives and constraints need to be linear in order to be solved easily), due to the nature of the reinforcement learning problem formulation, the framework does not need to meet these conditions to identify the optimal restructuring strategy Turning now to FIG. 4, FIG. 4 shows a diagram of a computing device in accordance with one or more embodiments disclosed herein.

In one or more embodiments disclosed herein, the computing device (400) may include one or more computer processors (402), non-persistent storage (404) (e.g., volatile memory, such as RAM, cache memory), persistent storage (406) (e.g., a non-transitory computer readable medium, a hard disk, an optical drive such as a CD drive or a DVD drive, a Flash memory, etc.), a communication interface (412) (e.g., Bluetooth interface, infrared interface, network interface, optical interface, etc.), an input device(s) (410), an output device(s) (408), and numerous other elements (not shown) and functionalities. Each of these components is described below.

In one or more embodiments, the computer processor(s) (402) may be an integrated circuit for processing instructions. For example, the computer processor(s) (402) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (e.g., a LAN, a WAN, Internet, mobile network, etc.) and/or to another device, such as another computing device.

In one or more embodiments, the computing device (400) may include one or more output devices (408), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

The problems discussed throughout this application should be understood as being examples of problems solved by embodiments described herein, and the various embodiments should not be limited to solving the same/similar problems. The disclosed embodiments are broadly applicable to address a range of problems beyond those discussed herein.

One or more embodiments disclosed herein may be implemented using instructions executed by one or more processors of a computing device. Further, such instructions may correspond to computer readable instructions that are stored on one or more non-transitory computer readable mediums.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for managing resources of an organization, the method comprising:
 obtaining, by an analyzer, historical data, wherein the historical data comprises a first dataset and a second dataset;
 providing, by the analyzer, the first dataset to a multilayer perceptron (MLP) and the second dataset to an engine;
 processing, by the MLP, the first dataset to generate a latent space representation (LSR) of data specified in the first dataset;
 providing, by the MLP, the LSR of the data to a cross-attention layer (CAL);

processing, by the engine, the second dataset to generate a textual embedding;
providing, by the engine, the textual embedding to the CAL;
fusing, by the CAL, the LSR of the data with the textual embedding to generate a final embedding;
providing, by the CAL, the final embedding to a clustering module (CM);
identifying, by the CM and using the final embedding, collectors that share similar features;
generating, by the CM and based on the identifying, a first group of collectors with the similar features and a second group of collectors with second similar features;
providing, by the CM, the first group of collectors and the second group of collectors to a reinforcement learning module (RLM);
analyzing, by the RLM, the first group of collectors and the second group of collectors to infer a first sequential dynamic of the first group of collectors and a second sequential dynamic of the second group of collectors;
generating, by the RLM, a model that identifies an optimal policy that directs a restructuring action to be taken in order to maximize a reward function;
training, by the RLM and based on the first sequential dynamic and the second sequential dynamic, the model to generate a trained model;
receiving, by the RLM, a restructuring request from a user via a graphical user interface;
obtaining, by the RLM and upon receiving the request, current groups of collectors;
analyzing, by the RLM and using the trained model, details associated with the current groups of collectors;
making, by the RLM and based on the details, a determination that a second restructuring action needs to be applied; and
initiating, by the RLM, applying the second restructuring action to continue satisfying the organization's goals.

2. The method of claim 1, wherein the first dataset comprises at least collector specific information, debtor specific information, and portfolio specific information.

3. The method of claim 2, wherein the collector specific information specifies at least one selected from a group consisting of a collector's level in the organization, date information specifying when the collector has joined to the organization, and second details associated with a manager of the collector.

4. The method of claim 2, wherein the debtor specific information specifies at least one selected from a group consisting of an identifier of a debtor, a number of calls made by a collector to the debtor, a number of electronic mails sent to the debtor by the collector, the collector's friction rate with the debtor, a debt amount owed against each invoice of the debtor, a number of disputes related to an invoice associated with the debtor, the debtor's previous repayment behavior, and a payment risk associated with the debtor.

5. The method of claim 2, wherein the portfolio specific information specifies at least one selected from a group consisting of an amount of money that is being handled by a collector, a number of accounts that are being handled by the collector, a number of invoices that are being handled by the collector, a second number of invoices with past due balances, a number of communication attempts performed by the collector to reach out a debtor, and a risk level of a portfolio.

6. The method of claim 5, wherein the portfolio specifies at least a set of debtors on which the collector needs to execute a plurality of debt recovery actions.

7. The method of claim 1, wherein the second dataset comprises at least collector notes information.

8. The method of claim 7, wherein the collector notes information specifies at least one selected from a group consisting of a summary of a collector-debtor interaction, a first experience of a collector resulting from the interaction, a second experience of a debtor resulting from the interaction, a reason specifying why a payment is delayed, and a mistake detected in an invoice.

9. The method of claim 1, wherein the similar features that are shared across the collectors specify at least one selected from a group consisting of a collector's job profile within the organization, a number of calls handled by the collector, a number of communication attempts performed by the collector to reach out a debtor, and promptness of the collector to maintain a satisfactory collector-debtor interaction.

10. The method of claim 1,
wherein the first sequential dynamic represents a first number collectors within the first group of collectors who are to leave the organization, and
wherein the second sequential dynamic represents a second number of collectors within the second group of collectors who are moved from the first group of collectors to the second group of collectors because of a restructuring in the organization.

11. The method of claim 1, wherein the model is generated by employing a Markov decision process, wherein the Markov decision process considers sequential dynamics of the workforce on a quarterly basis in order to generate a plurality of workforce restructuring strategies based on the organization's goals.

12. The method of claim 1, wherein, to generate the textual embedding, the second dataset is process by employing at least a bidirectional long short-term memory network.

13. The method of claim 1,
wherein the reward function represents the organization's strategic goals, and
wherein the reward function ensures that the workforce is restructured without affecting debt collection operations across the organization.

14. The method of claim 1, wherein the restructuring action is performing an operating expenditure reduction with the workforce.

15. The method of claim 1, wherein the trained model ensures that groups of collectors are restructured by satisfying the organization's goals in different employment conditions.

16. The method of claim 1, wherein the second restructuring action needs to be applied in order to maintain a minimum number of collectors per group and in order to make sure that each collector in each group has an optimal number of portfolios to manage.

17. A method for managing resources of an organization, the method comprising:
obtaining, by an analyzer, historical data, wherein the historical data comprises a first dataset and a second dataset;
providing, by the analyzer, the first dataset to a multilayer perceptron (MLP) and the second dataset to an engine;
processing, by the MLP, the first dataset to generate a latent space representation (LSR) of data specified in the first dataset;
providing, by the MLP, the LSR of the data to a cross-attention layer (CAL);

processing, by the engine, the second dataset to generate a textual embedding;

providing, by the engine, the textual embedding to the CAL;

fusing, by the CAL, the LSR of the data with the textual embedding to generate a final embedding;

providing, by the CAL, the final embedding to a clustering module (CM);

identifying, by the CM and using the final embedding, collectors that share similar features;

generating, by the CM and based on the identifying, a first group of collectors with the similar features and a second group of collectors with second similar features;

providing, by the CM, the first group of collectors and the second group of collectors to a reinforcement learning module (RLM);

analyzing, by the RLM, the first group of collectors and the second group of collectors to infer a first sequential dynamic of the first group of collectors and a second sequential dynamic of the second group of collectors;

generating, by the RLM, a model that identifies an optimal policy that directs a restructuring action to be taken in order to maximize a reward function;

training, by the RLM and based on the first sequential dynamic and the second sequential dynamic, the model to generate a trained model; and initiating, by the RLM and via a graphical user interface (GUI), notification of an administrator about the trained model.

18. The method of claim 17, further comprising:
after the notification of the administrator:
  receiving, by the RLM, a restructuring request from a user via the GUI;
  obtaining, by the RLM and upon receiving the request, current groups of collectors;
  analyzing, by the RLM and using the trained model, details associated with the current groups of collectors;
  making, by the RLM and based on the details, a determination that a second restructuring action needs to be applied; and
  initiating, by the RLM, applying the second restructuring action to continue satisfying the organization's goals.

19. A method for managing resources of an organization, the method comprising:
  receiving, by a reinforcement learning module (RLM), a restructuring request from a user via a graphical user interface (GUI);
  obtaining, by the RLM and upon receiving the request, current groups of collectors;
  analyzing, by the RLM and using a trained model, details associated with the current groups of collectors;
  making, by the RLM and based on the details, a determination that a first restructuring action needs to be applied; and
  initiating, by the RLM, applying the first restructuring action to continue satisfying the organization's goals.

20. The method of claim 19, further comprising:
prior to receiving the request from the user:
  obtaining, by an analyzer, historical data, wherein the historical data comprises a first dataset and a second dataset;
  providing, by the analyzer, the first dataset to a multi-layer perceptron (MLP) and the second dataset to an engine;
  processing, by the MLP, the first dataset to generate a latent space representation (LSR) of data specified in the first dataset;
  providing, by the MLP, the LSR of the data to a cross-attention layer (CAL);
  processing, by the engine, the second dataset to generate a textual embedding;
  providing, by the engine, the textual embedding to the CAL;
  fusing, by the CAL, the LSR of the data with the textual embedding to generate a final embedding;
  providing, by the CAL, the final embedding to a clustering module (CM);
  identifying, by the CM and using the final embedding, collectors that share similar features;
  generating, by the CM and based on the identifying, a first group of collectors with the similar features and a second group of collectors with second similar features;
  providing, by the CM, the first group of collectors and the second group of collectors to the RLM;
  analyzing, by the RLM, the first group of collectors and the second group of collectors to infer a first sequential dynamic of the first group of collectors and a second sequential dynamic of the second group of collectors;
  generating, by the RLM, a model that identifies an optimal policy that directs a second restructuring action to be taken in order to maximize a reward function;
  training, by the RLM and based on the first sequential dynamic and the second sequential dynamic, the model to generate the trained model; and
  initiating, by the RLM and via the (GUI), notification of an administrator about the trained model.

* * * * *